United States Patent
Cooperman et al.

(10) Patent No.: US 6,643,294 B1
(45) Date of Patent: Nov. 4, 2003

(54) DISTRIBUTED CONTROL MERGED BUFFER ATM SWITCH

(75) Inventors: Michael Cooperman, Framingham, MA (US); John E. Rathke, Southborough, MA (US); Nee-Ben Gee, Needham, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/458,155

(22) Filed: Dec. 9, 1999

(51) Int. Cl.[7] .................................................. H04J 3/14
(52) U.S. Cl. ...................................... 370/413; 370/236
(58) Field of Search ................................. 370/236, 371, 370/395.4, 412, 413, 416

(56) References Cited

U.S. PATENT DOCUMENTS

| | | | |
|---|---|---|---|
| 4,701,907 A | * 10/1987 | Collins | 370/371 |
| 5,721,833 A | 2/1998 | Cooperman et al. | 395/250 |
| 5,774,463 A | 6/1998 | Cooperman et al. | 370/355 |
| 5,862,128 A | * 1/1999 | Cooperman et al. | 370/236 |
| 5,923,656 A | * 7/1999 | Duan et al. | 370/395.4 |
| 6,333,980 B1 | * 12/2001 | Hollatz et al. | 379/265.12 |

* cited by examiner

*Primary Examiner*—Salvatore Cangialosi
(74) *Attorney, Agent, or Firm*—Leonard Charles Suchyta; James K. Weixel

(57) ABSTRACT

A switch includes input ports, output ports, and merged buffers corresponding to the output ports. Each of the input ports receives cells of a data packet from a source. The output ports output the cells in an order in which they were received by the input ports. The merged buffers temporarily store the cells received by the input ports. Each of the merged buffers includes an output buffer, and input buffer, and a controller. The output buffer stores cells for transmission by a corresponding one of the output ports. The input buffer temporarily stores cells for rerouting to at least one different one of the output ports. The controller reroutes the cells stored in the input buffer to output buffers corresponding to the different output ports.

36 Claims, 20 Drawing Sheets

DISTRIBUTED CONTROL MERGED BUFFER ATM SWITCH

FIELD OF THE INVENTION

The present invention relates generally to cell relay systems and, more particularly, to a cell relay switch with a merged buffer architecture.

BACKGROUND OF THE INVENTION

Asynchronous transfer mode (ATM) switches provide high-speed data exchange while minimizing the impact on overall system bandwidth. ATMs are commonly used in local area networks (LANs) and wide area networks (WANs). Recently, however, ATM switches have been used in wideband data transfer protocols, such as synchronous optical network (SONET) and synchronous transport stream (STS) systems.

FIG. 1 is a block diagram of a conventional ATM switch 100. The switch 100 includes several input ports 110, several output ports 120, optical-to-digital (O/D) converters 130, digital-to-optical (D/O) converters 140, switching fabric 150, and controller 160. The input ports 110 receive data packets, including one or more cells, from a source on a corresponding set of high-speed optical input channels 115. The output ports 120 output the received cells to a destination on a corresponding set of high-speed optical output channels 125.

The O/D converters 130 connect to the input ports 110 to convert the received cells from optical signals to digital signals. The D/O converters 140 connect to the output ports 120 to convert the cells from digital signals back into optical signals for transmission by the output ports 120 on the output channels 125. The switching fabric 150 connects between the O/D and D/O converters 130 and 140. The switching fabric 150 transmits the received cells from an input port 110 to an appropriate output port 120 in response to a control signal from the controller 160. The controller 160 is a programmable device that controls the routing of the cells through the switch 100.

Cells arrive at the input ports 110 during a period called a time slot. In an ATM environment, the cells include a 5-octet header and a 48-octet information field. When a cell arrives at an input port 110, the controller 160 decodes the cell's header to determine the proper output port 120 for the cell. The controller 160 then configures the switching fabric 150 to transmit the cell to this output port 120. When such a cell arrives at a single input port 110 destined for a single output port 120, the cell is called a "unicast" or "point-to-point" cell. A "multicast" cell, on the other hand, arrives at a single input port 110 destined for several of the output ports 120. In contrast, a "broadcast" cell arrives at a single input port 110 destined for all of the output ports 120.

When several cells arrive at different input ports 110 destined for the same output port 120, conflicts or contentions result. Cell contention introduces throughput limitations, slowing the operation of the switch 100.

In addition, ATM protocol mandates that a switch 100 transmit cells from its output ports 120 in the same order that they arrived at its input ports 110. This makes the switch 100 effectively transparent to the communication medium by assuring that packets of arriving cells are not reordered when they leave the switch 100. With cells arriving on several different input ports 110 during each time slot, often contending for the same output ports 120, maintaining cell sequence and high throughput rates becomes difficult.

To address these deficiencies, conventional ATM switch architectures employ output-buffering, input-buffering, or shared memory techniques to facilitate data flow and maintain cell sequence between the input ports and the output ports. FIG. 2 is a block diagram of a conventional switch 200 employing the output-buffering technique. The switch 200 includes several input ports 210, several output ports 220, several output buffers 230, and a controller 240.

Each of the input ports 210 connects to all of the output buffers 230. The output ports 220, however, connect to only a single dedicated buffer 230. As a result, the buffers 230 contain multiple inputs and a single output. The controller 240 is a content addressable memory (CAM) controller that controls the operation of the buffers 230.

When a cell arrives at one of the input ports 210, the controller 240 decodes the cell's header and instructs a particular one of the output buffers 230, corresponding to the designated output port 220, to store the cell. When the arriving cell is a multicast or broadcast cell, however, the controller 240 instructs several or all of the corresponding buffers 230 to store the cell during the time slot. If, for example, N cells destined for the same output port 220 arrive at different or all of the input ports 210, the controller 240 instructs the corresponding buffer 230 to store the N cells during a single time slot. To accomplish this, the switch 200 slows down its throughput rate N times. As a result, the per-port rate of output-buffered ATM switches, such as switch 200, becomes limited by the number of input ports 210.

Another conventional architecture is the input-buffering architecture. FIG. 3 is a block diagram of a conventional switch 300 employing the input-buffering technique. The switch 300 includes several input ports 310, several output ports 320, several-input buffers 330, a circuit switch matrix 340, and a controller 350.

Each of the input ports 310 connects to a dedicated one of the input buffers 330. The output ports 320, however, connect to all of the buffers 330 via the circuit switch matrix 340. The switch matrix 340 connects the input buffers 330 to the output ports 320 based on control signals from the controller 350. The controller 350 is a CAM controller that controls both the buffers 330 and the circuit switch matrix 340.

When a cell arrives on an input port 310, the input port 310 writes the cell directly into its dedicated input buffer 330. The controller 350 decodes the cell's header and controls the switch matrix 340 to route the cell to the correct output port 320.

As with output-buffered architectures (e.g., FIG. 2), input-buffered ATM configurations suffer from reduced throughput. For example, assume that a first cell arrives at a first input buffer 330 for multicasting to two output ports 320. Assume also that second and third cells stored in other buffers 330 contend for the same two output ports 320. In this case, the first buffer 330 stores the first cell until the two output ports 320 become available. Because each buffer 330 can only transmit a single cell during any given time slot, the first buffer 330 cannot transmit the cells to both output ports 320 during the same time slot. Thus, the throughput becomes limited by the number of output ports 320.

Another conventional architecture is the shared-memory ATM architecture. FIG. 4 is a block diagram of a conventional switch 400 employing the shared memory technique. The switch 400 includes several input ports 410, several output ports 420, a shared buffer 430, and a controller 440.

Each of the input ports 410 and output ports 420 connect to the shared buffer 430. The shared buffer 430 is a common memory that stores and outputs cell data based on control signals from the controller 440. The buffer 430 efficiently stores the cells by permitting active input ports 410 to use the memory space of inactive input ports 410. The controller 440 is a CAM controller that controls the operation of the buffer 430.

Like the other conventional switches 100–300, the shared memory switch 400 also has its limitations. For example, during each time slot, the shared buffer 430 can only store N cells and output N cells, where N is the number of the input and output ports 410 and 420. This again results in reduced throughput by a factor of N.

The primary disadvantage of each of the above architectures is that the per-port bandwidth is limited by the number N of input and/or output ports. For example, assuming that a buffer can store a cell every 20 ns, then a transfer rate of $424/(20\times10^{-9})=21.2$ Gbits/sec becomes possible, where 424 is the number of bits per cell written into the buffer in parallel. In the above prior art configurations, however, the number of input and/or output ports N limits the maximum possible transfer rate. Therefore, in each configuration the per-port input/output rates are defined by 21.2/N or S/N, where S is the input/output buffer speed. Thus, to obtain a per-port rate of 2.4 Gb/s, the maximum number of input and output ports becomes limited to eight.

To overcome the throughput and port limitations of the conventional switches, assignee of the present invention developed a merged buffer ATM (MBA) architecture with centralized control. The MBA architecture combines the advantages of the output buffering, input buffering, and shared memory architectures, while avoiding their disadvantages. The centralized control MBA architecture is described in U.S. Pat. No. 5,862,128, issued Jan. 19, 1998, which is incorporated by reference.

FIG. 5 is a block diagram of a centralized control MBA system 500. The system 500 includes several input ports 510, several output ports 520, several merged buffers 530, a circuit switch matrix 540, and a controller 550. Each of the input ports 510 receives cells of a data packet from a source over data channels. The input ports 510 connect to the merged buffers 530 via the circuit switch matrix 540 and conventional tristate devices 565. The switch matrix 540 transmits cells received at the input ports 510 to their proper buffers 530.

The merged buffers 530 include conventional memory devices for temporarily storing cells received at the input ports 510. Each of the merged buffers 530 connects to a corresponding one of the output ports 520. The buffers 530 also connect to the switch matrix 540 via feedback paths 560. The feedback path 560 includes conventional tristate devices 565.

The controller 550 controls the operation of the switch matrix 540 and the buffers 530. The controller 550 is a CAM controller that includes a header processor 555 to decode the cell headers and configure the switch matrix 540. The header processor 555 generates an internal routing header for the cells received at the input ports 510. The routing header includes information, such as the cell's priority, the output port destination, and a sequence number defining the order in which the cell was received by the input port 510 with respect to other cells belonging to the same data packet.

The controller 550 stores a table of cell pointers that identify the locations in the buffers 530 at which the cells are stored. Using the cell pointer list, the controller 550 tracks the location of the cells as they move within the system 500.

The system 500 divides the cell processing time slot into two slots, time slot TSA and time slot TSB. During time slot TSA, the system 500 performs input and output functions (i.e., storing cells received at its input ports 510 and transmitting stored cells from its output ports 520). During time slot TSB, the system 500 processes cells stored within the merged buffers 530.

The system 500 processes cells as follows. During time slot TSA, the input ports 510 receive cells from the data channels. The controller 550 reads the cells' headers to determine the destination output ports 520 for the cells. The controller 550 generates internal routing headers for the cells. The routing headers include, for example, the cell's priority, the identity of the destination output port 520, and the cell's sequence number.

Based on the destination output ports 520 for the cells, the controller 550 determines whether any output port conflict exists. An output port conflict exists when two or more cells contend for the same output port 520. The controller 550 resolves any conflicts using a conventional arbitration algorithm (e.g., based on "first come," which resolves the conflict based on the first cell to arrive at an input port) to determine a "winner" cell and one or more "loser" cells.

The controller 550 then configures the switch matrix 540 to route the winner cell and any non-conflicting cells to the destination buffers 530 corresponding to their destination output ports 520. The controller 550 configures the switch matrix 540 to route the loser cells to non-destination buffers 530. The "destination" and "non-destination" buffers are physically one buffer that is logically partitioned. The non-destination buffers 530 refer to any of the buffers other than the destination buffer 530. The controller 550 may determine which buffers to use as the non-destination buffers 530 in a number ways, including selecting a buffer randomly or sequentially.

The switch matrix 540 routes the cells to the destination buffers 530. When the buffers 530 store the cells, the controller 550 updates its table to record the location of the cells within the buffers 530.

While the above processing occurs, the controller 550 identifies the next cell in each buffer 530 to be sent to the corresponding output ports 520 based on information stored in its table. The controller 550 then instructs the buffers 530 to send the identified cells to the output ports 520 for transmission to their destinations.

During time slot TSB, the controller 550 determines the identity of the cells that have been "misrouted" (i.e., routed to non-destination buffers 530). The controller 550 instructs the non-destination buffers 530 to output the identified cells to the feedback path 560. The tristates 565 enable the feedback path 560 to transmit the identified cells to the switch matrix 540.

Once again, the controller 550 determines whether any conflict exists among the misrouted cells. The controller 550 then determines the winner and loser cells and configures the switch matrix 540 to transmit the cells to the appropriate buffers 530. The above processing repeats for subsequent time slots until all of the originally received cells reach their destination buffers 530.

The centralized control MBA system 500 alleviates the throughput bottleneck that results when the number of ports increases in the conventional systems described above. A limitation still exists, however, because the controller 550 must service each of the ports for input and output cell processing during each time slot. Thus, when the number of ports increases, the time that the controller 550 can spend servicing a port during a time slot decreases.

If the system speed is 2.4 Gb/s and the time slot period equals 170 ns, the controller 550 must service all N ports during this 170 ns time slot. For a sixteen port system, for example, the controller 550 has approximately 10 ns to service each port. This 10 ns further reduces as the number of ports increases or as the port speed increases.

Therefore, a need exists to overcome the throughput and port limitations of the conventional switches described above.

SUMMARY OF THE INVENTION

Systems and methods consistent with the present invention address this need by providing a merged buffer architecture that eliminates the throughput and port limitations of the conventional architectures. The merged buffer architecture combines the advantages of the output buffering, the input buffering, and the shared memory architectures without their incorporating their disadvantages.

In accordance with the purpose of the invention as embodied and broadly described herein, a system consistent with the present invention includes input ports, output ports, and merged buffers corresponding to the output ports. Each of the input ports receives cells of a data packet from a source. The output ports output the cells in an order in which they were received by the input ports. The merged buffers temporarily store the cells received by the input ports. Each of the merged buffers includes an output buffer, and input buffer, and a controller. The output buffer stores cells for transmission by a corresponding one of the output ports. The input buffer temporarily stores cells for rerouting to at least one different one of the output ports. The controller reroutes the cells stored in the input buffer to output buffers corresponding to the different output ports.

In accordance with another implementation consistent with the present invention, a routing vector data structure guides a cell through a switch from its input port to its output port. The routing vector data structure includes an input port number, a sequence number, an output port number, and a misrouted cell sequence number. The input port number identifies an input port that received the cell. The sequence number identifies a position of the cell within a data packet. The output port number identifies an output port from which the cell is to be transmitted. The misrouted cell sequence number identifies the sequence of a cell routed to a buffer of an output port other than the output port identified by the output port number.

BRIEF DESCRIPTION OF THE DRAWINGS

The accompanying drawings, which are incorporated in and constitute a part of this specification, illustrate an embodiment of the invention and, together with the description, explain the principles of the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention overcome the throughput and port limitations of conventional switches by combining the advantages of conventional output buffering, input buffering, and shared memory architectures.

DISTRIBUTED CONTROL MBA SYSTEM

Figure 1:
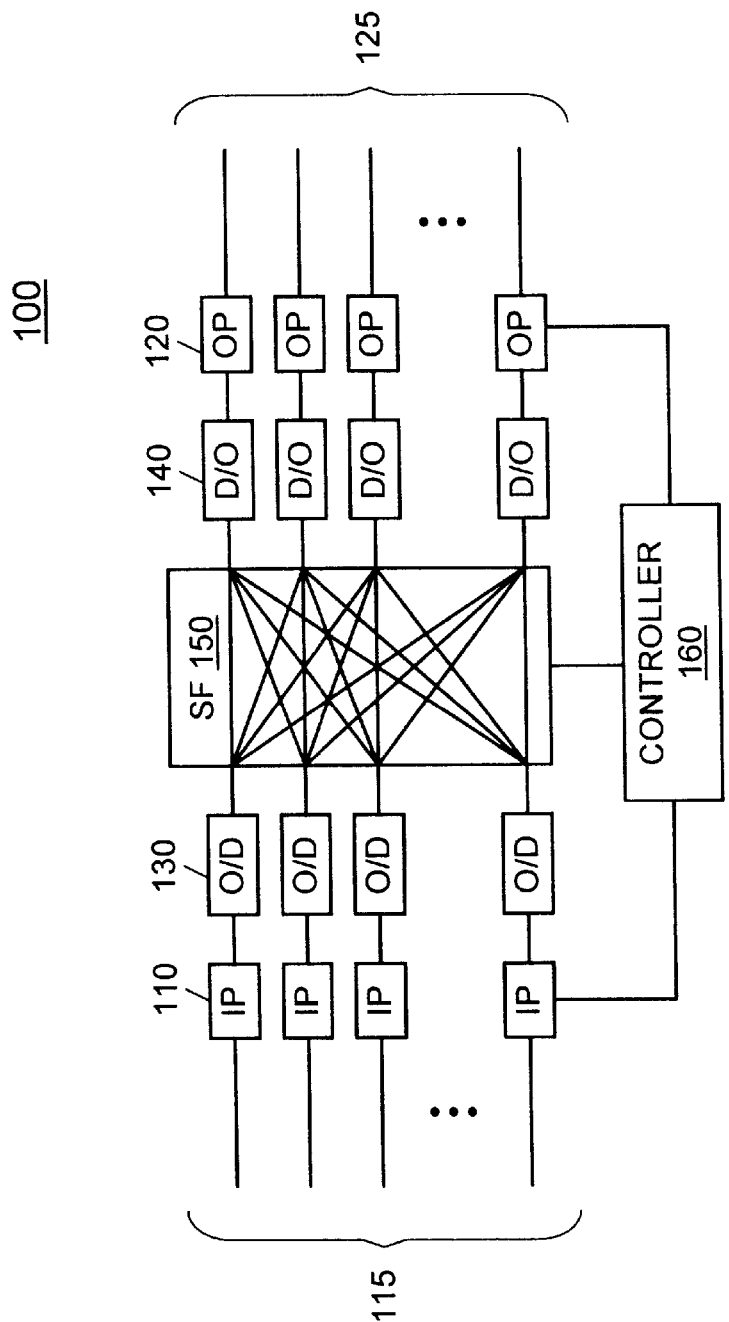
FIG. 1 is a block diagram of a conventional ATM switch.
Figure 2:
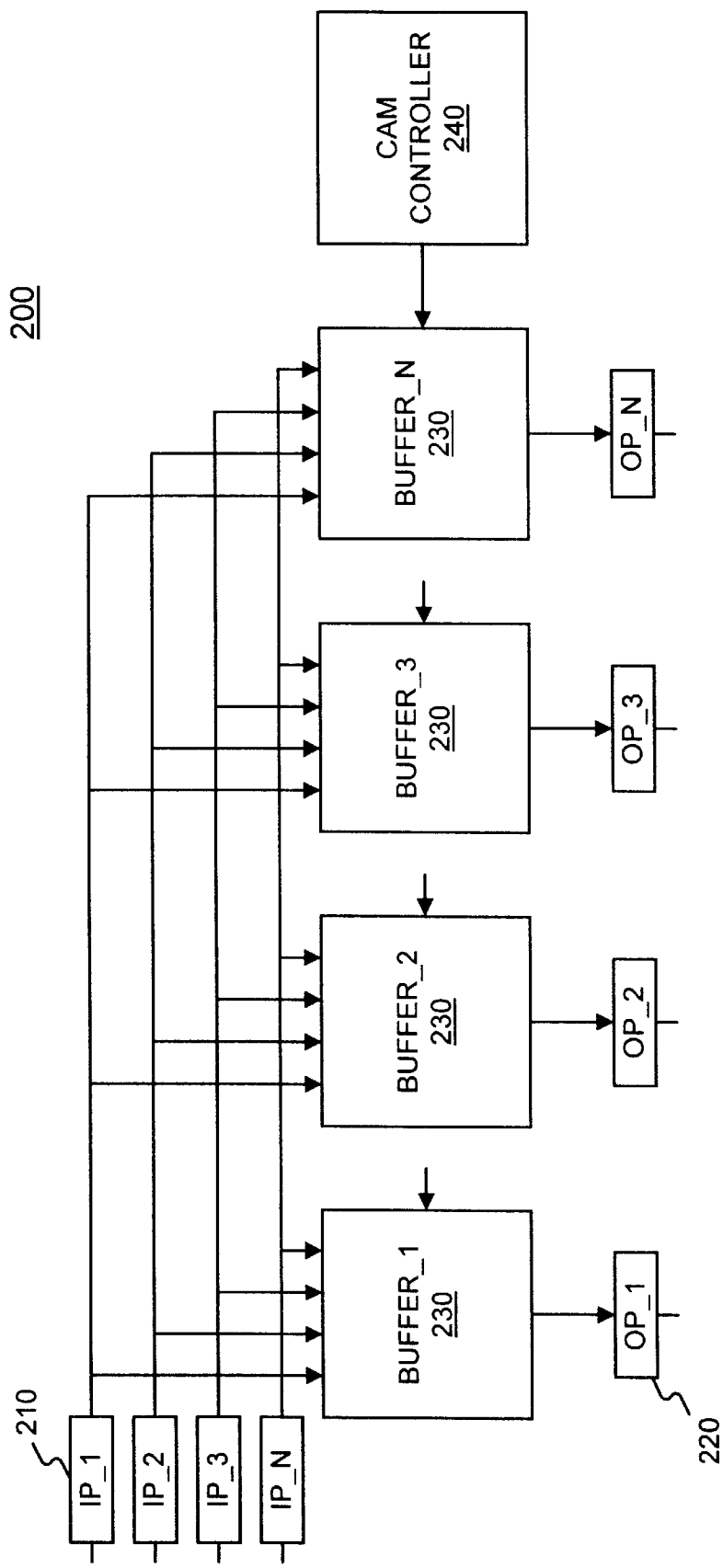
FIG. 2 is a block diagram of a conventional switch employing an output-buffering technique.
Figure 3:
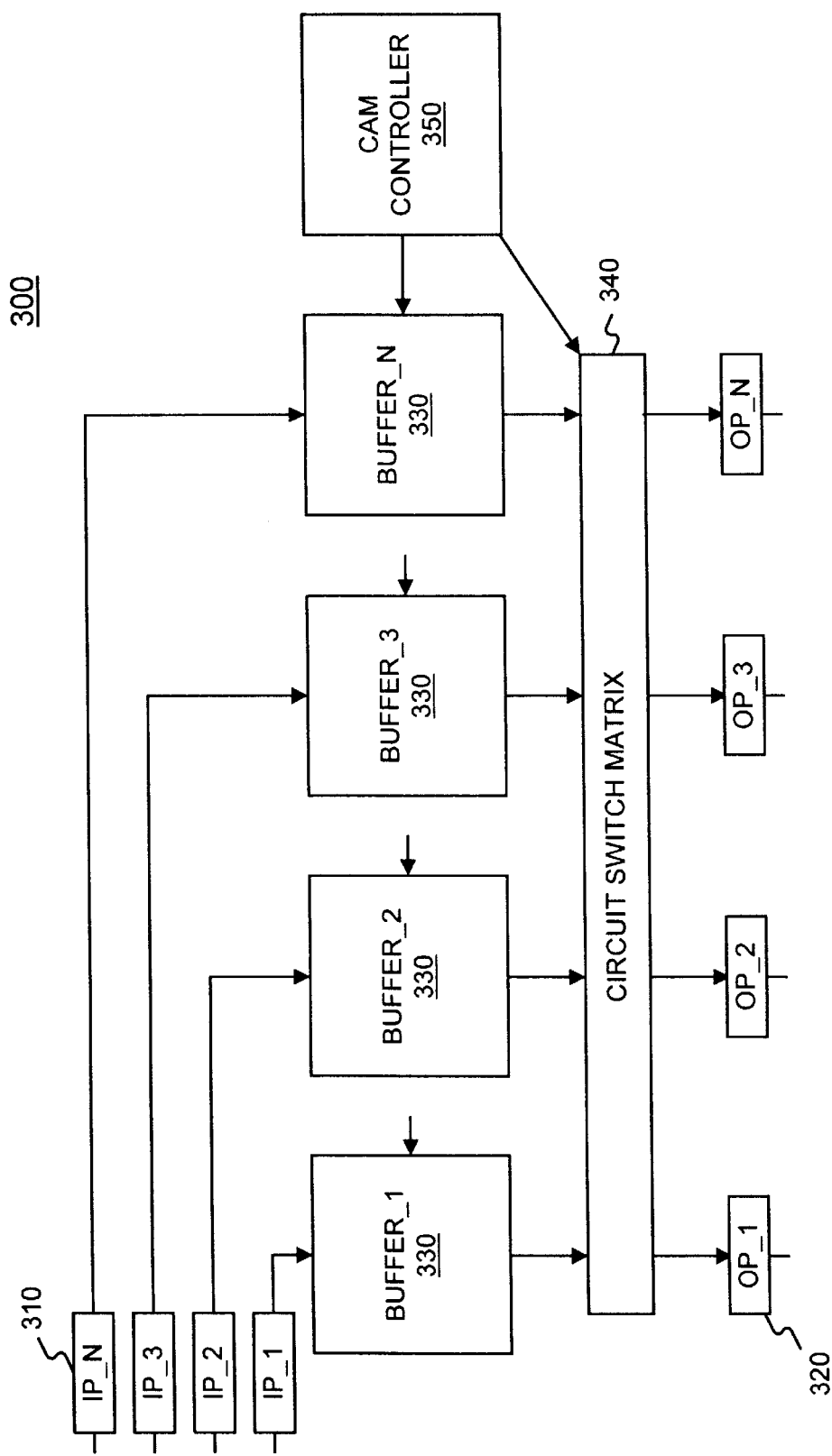
FIG. 3 is a block diagram of a conventional switch employing an input-buffering technique.
Figure 4:
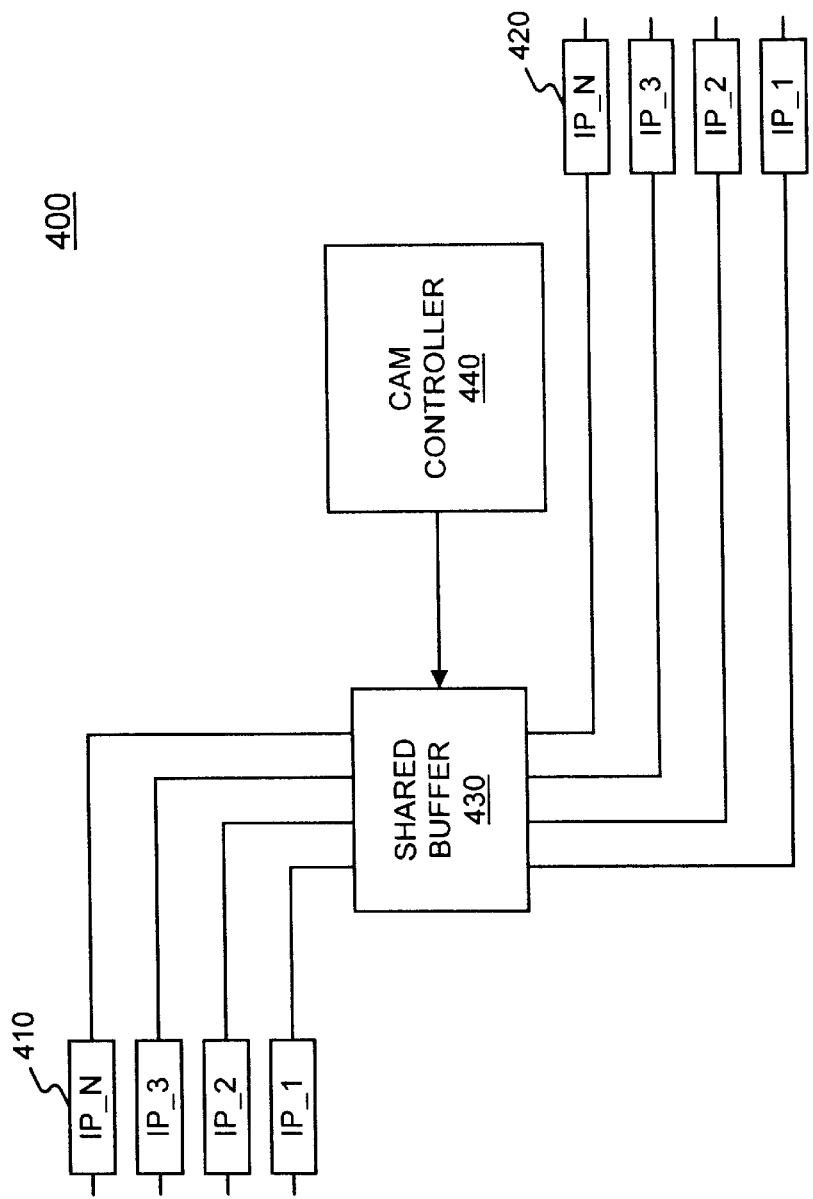
FIG. 4 is a block diagram of a conventional switch employing a shared memory technique.
Figure 5:
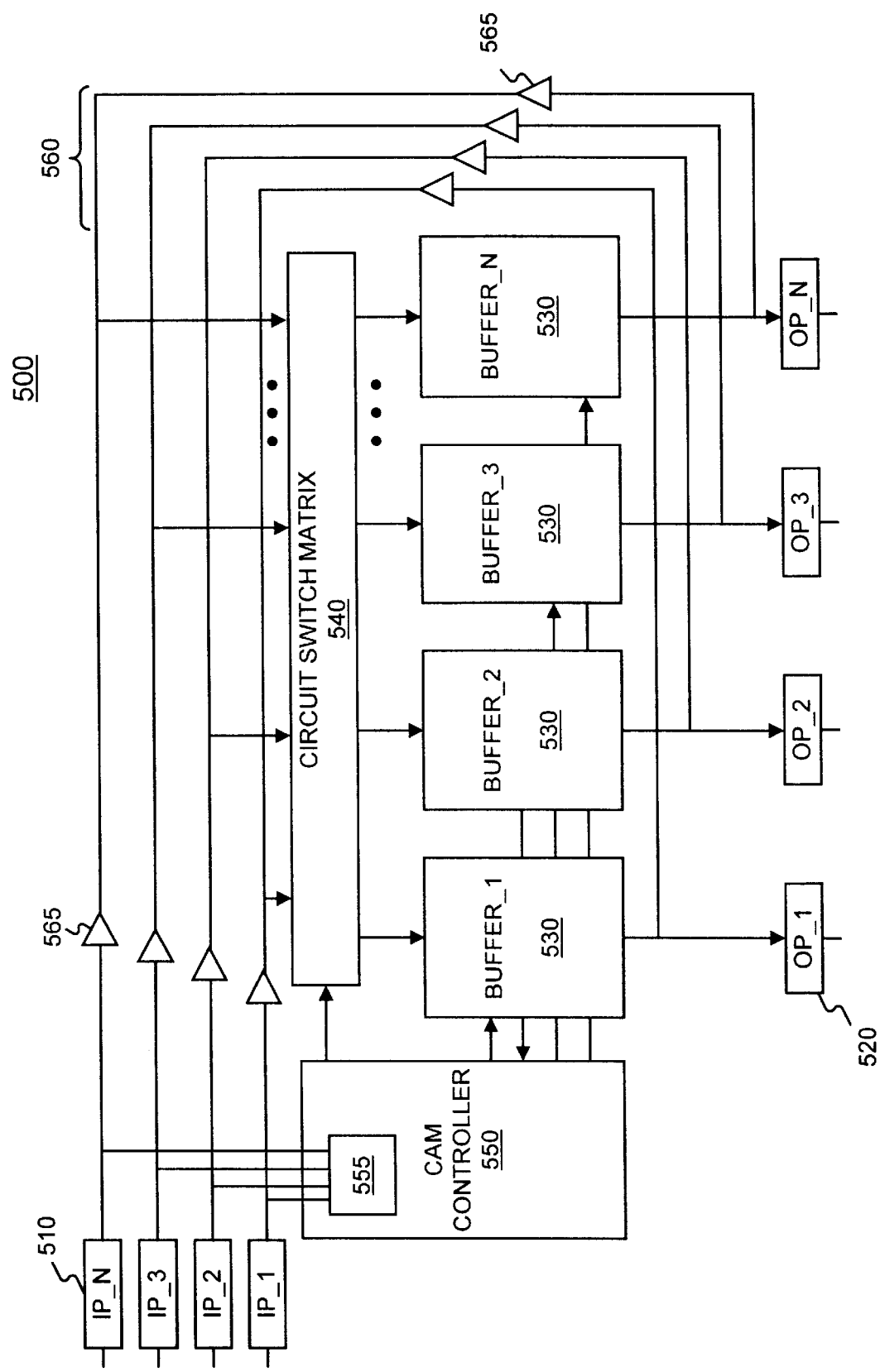
FIG. 5 is a block diagram of a centralized control merged buffer ATM system.
Figure 6:
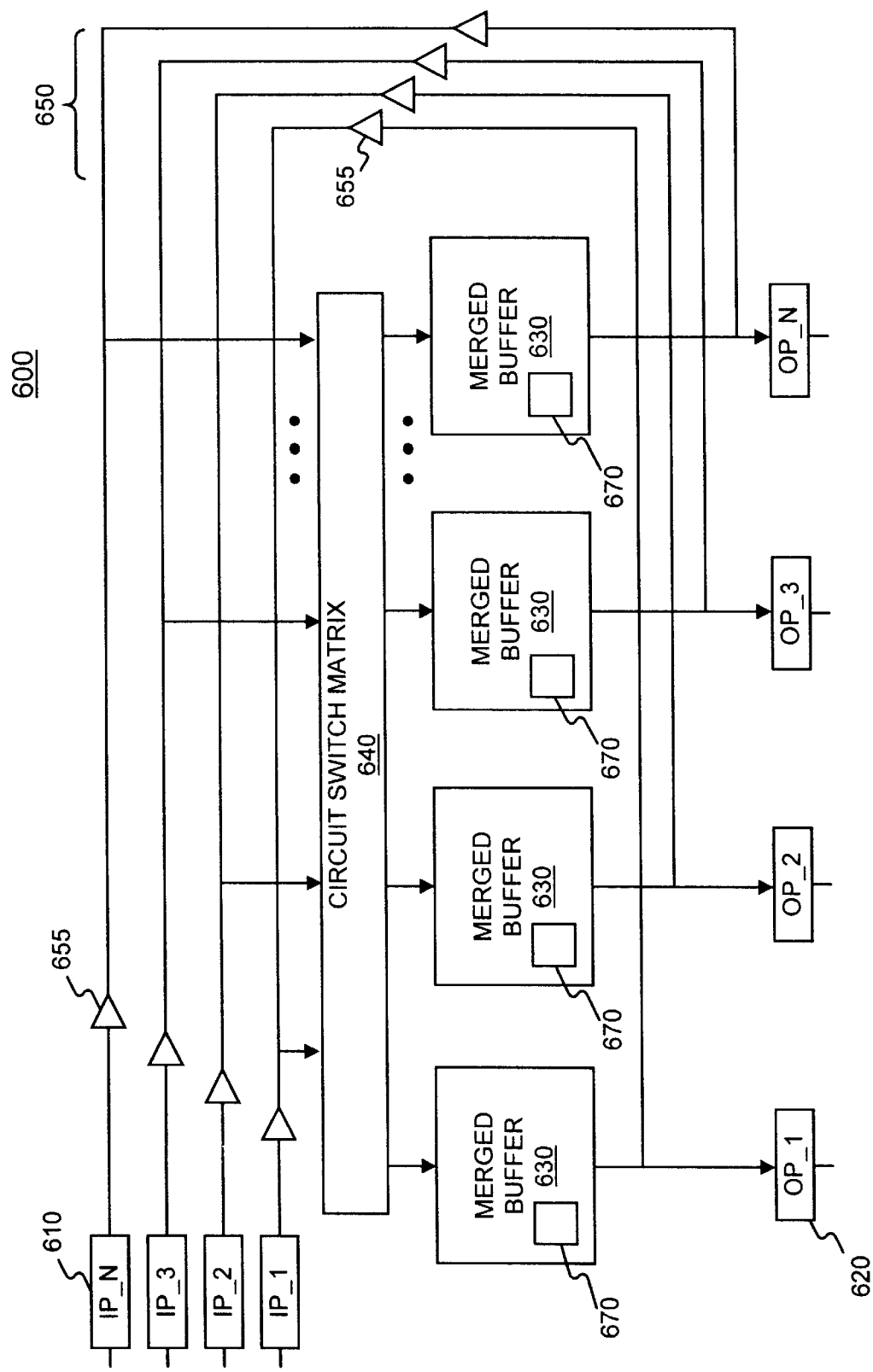
FIG. 6 is a block diagram of a distributed control merged buffer ATM system consistent with the present invention.

FIG. 6 is a block diagram of a distributed control merged buffer ATM (MBA) system 600 consistent with the present invention. The system 600 includes several input ports 610, several output ports 620, several merged buffers 630, and a circuit switch matrix 640. Associated with each of the merged buffers 630 is a controller 670. As shown, the controller 670 is a part of each buffer 630, although it may be implemented as a separate component.

Figure 7:
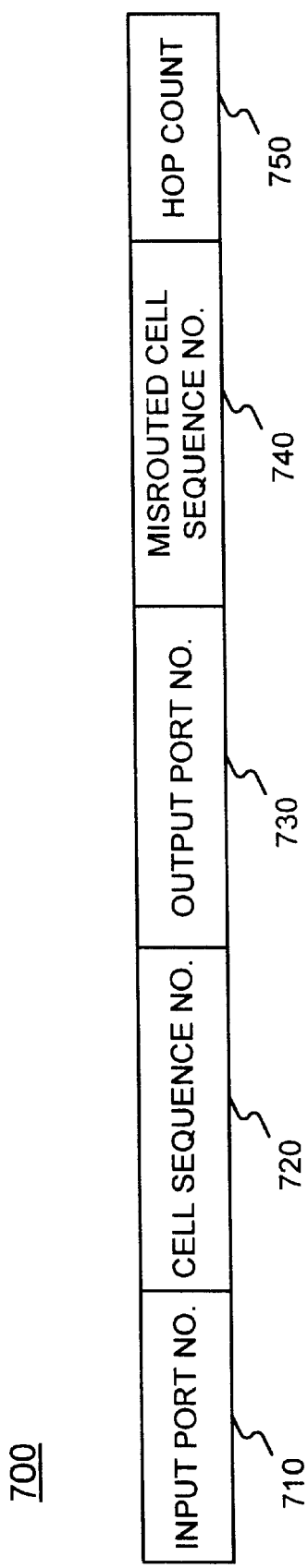
FIG. 7 is a diagram of a routing vector consistent with the present invention.

Each of the input ports 610 includes mechanisms for receiving cells of a data packet from a source over a data channel, for decoding the cells' headers, and for generating routing vectors from the decoded header information. FIG. 7 is a diagram of a routing vector 700 consistent with the present invention. The routing vector 700 includes an input port number 710, a cell sequence number 720, an output port number 730, a misrouted cell sequence number 740, and a hop count 750. The input port number 710 identifies the input port 610 at which the cell arrived.

The cell sequence number 720 identifies the location of the cell within the data packet (e.g., if the cell is the seventh cell in a ten cell data packet, then the cell sequence number is seven). ATM protocol requires that an ATM switch transmit cells from its output ports in the same order that they arrived at its input ports. The sequence number 720 permits tracking of the order of cells through the system 600. The sequence number 720 may additionally include a priority number to expedite the routing of a cell, or group of cells, through the system 600.

The output port number 730 includes an N-bit vector to identify from which of the N possible output port(s) 620 the cell is to be transmitted. For a point-to-point cell, the output port number 730 identifies one of N possible output ports 620. For a multicast cell, the output port number 730 identifies one of the $2^N-1$ possible combinations of output ports 620. For a broadcast cell, the output port number 730 identifies a single combination of output ports 620 (i.e., all of the output ports).

The misrouted cell sequence number 740 identifies the sequence of the cell within the misrouted data stream for a buffer 630. A cell may be misrouted when it contends with another cell for the same output port 620. For example, controller 670 assigns an increasing sequence number for each subsequent misrouted cell sent to a buffer 630.

The hop count 750 includes information regarding an age of a cell (i.e., the length of time in clock cycles that the cell has been in the system 600 before being transmitted from an output port 620).

The input ports 610 (FIG. 6) attach the routing vectors to the cells and transmit them to the merged buffers 630 via the circuit switch matrix 640 and tristate devices 655. The switch matrix 640 includes intelligence for determining the proper buffers 630 for the cells and for resolving conflicts among the cells. The switch matrix 640 reads the routing vectors for the cells to determine how to route them.

Each of the merged buffers 630 connects to a corresponding one of the output ports 620 and to the input of the switch matrix 640 via feedback paths 650. The feedback paths 650 include tristate devices 655.

Figure 8:
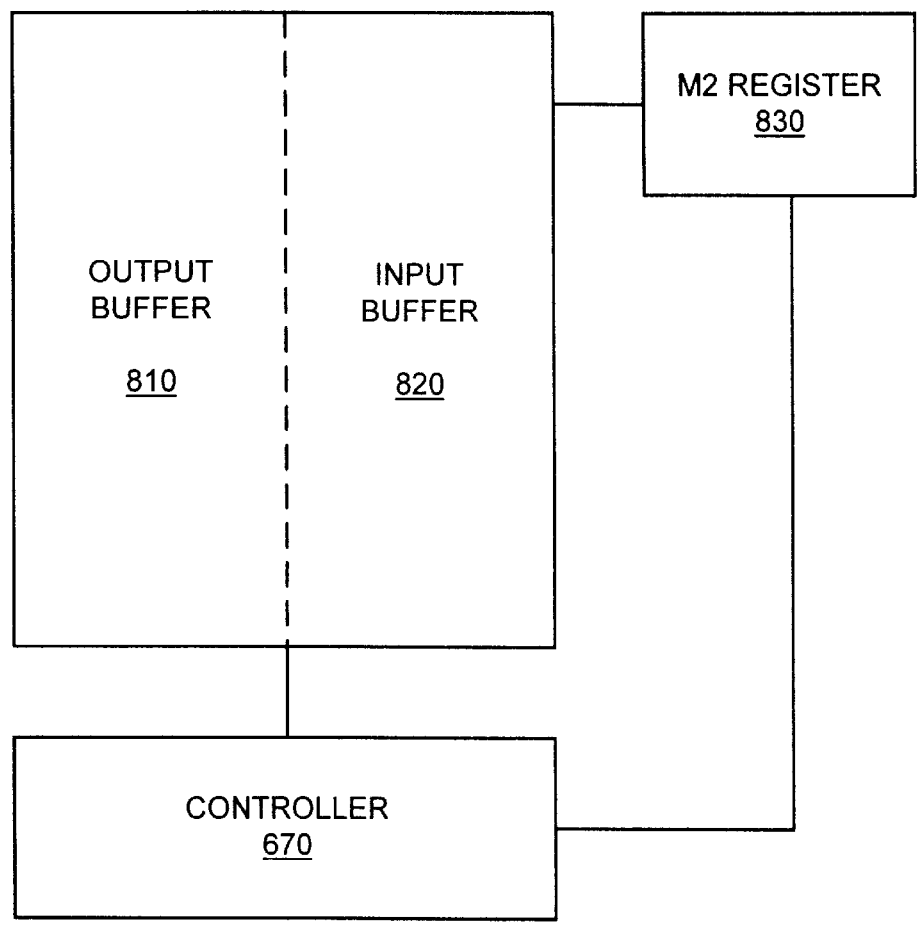
FIG. 8 is a block diagram of a merged buffer of FIG. 6.

FIG. 8 is a block diagram of a merged buffer 630. The merged buffer 630 includes output buffer 810, input buffer 820, M2 register 830, and controller 670. The output buffer 810 stores cells that have been properly routed for output from the corresponding output port 620. The input buffer 820, on the other hand, temporarily stores misrouted cells (i.e., cells destined for an output buffer 820 of another output port 620). The M2 register 830 is a one cell register that temporarily stores a cell that has been misrouted more than once. The M2 register 830 is a high priority register that assures that a misrouted cell reaches its proper destination in an expedited manner.

Figure 9:
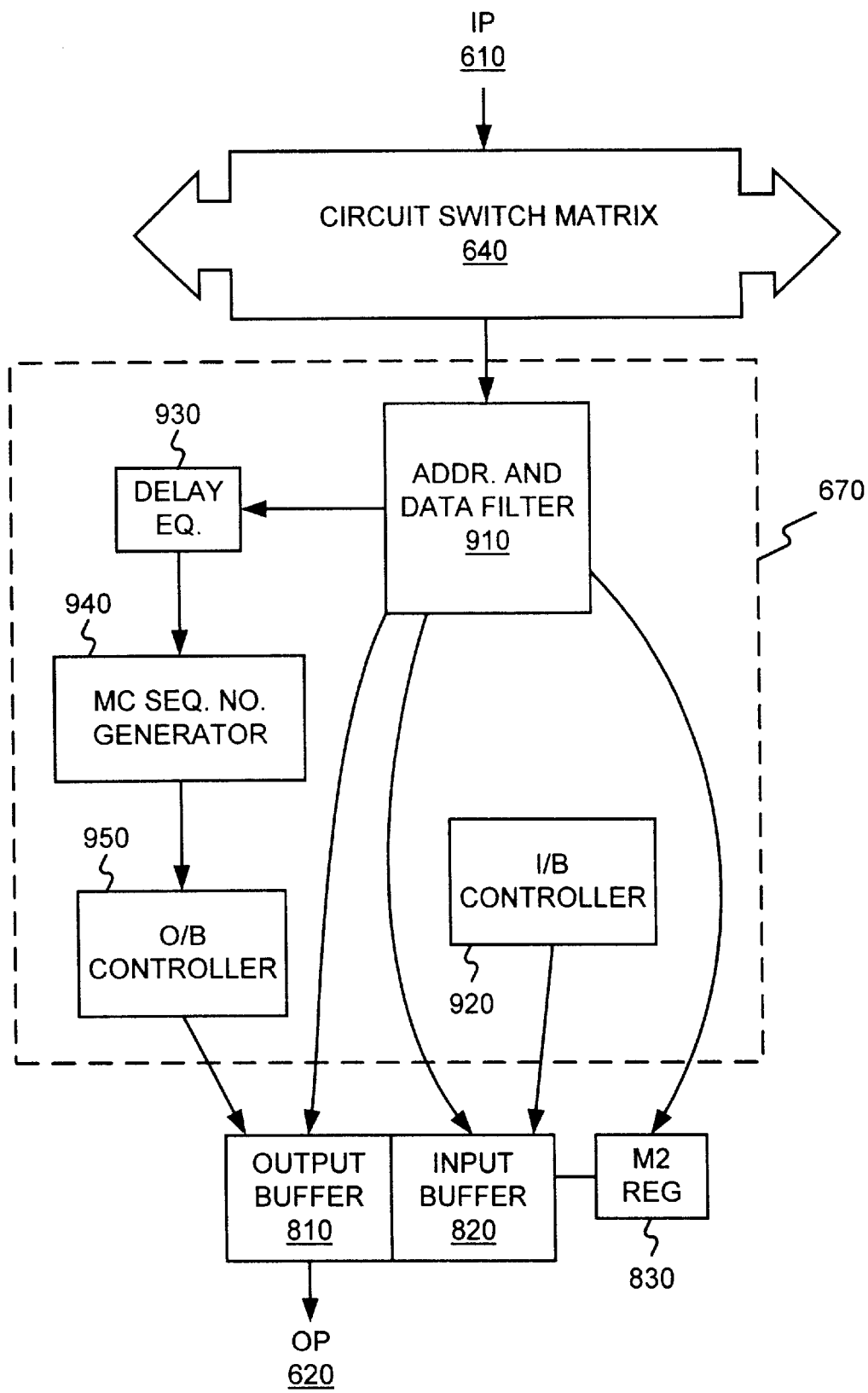
FIG. 9 is a block diagram of the controllers of FIG. 6.

The controller 670 controls the operation of the input and output buffers 820 and 810, respectively. FIG. 9 is a block diagram of the controller 670, including an address and data filter 910, an input buffer controller 920, a delay equalizer 930, a multicast sequence number generator 940, and an output buffer controller 950. The address and data filter 910 decodes an arriving cell's routing vector 700 to determine whether the cell is destined for the output port 620 corresponding to this output buffer 810. The input buffer controller 920 controls the operation of the input buffer 820 and manages the status of a cell, including its misrouted cell sequence number 740.

Figure 10:
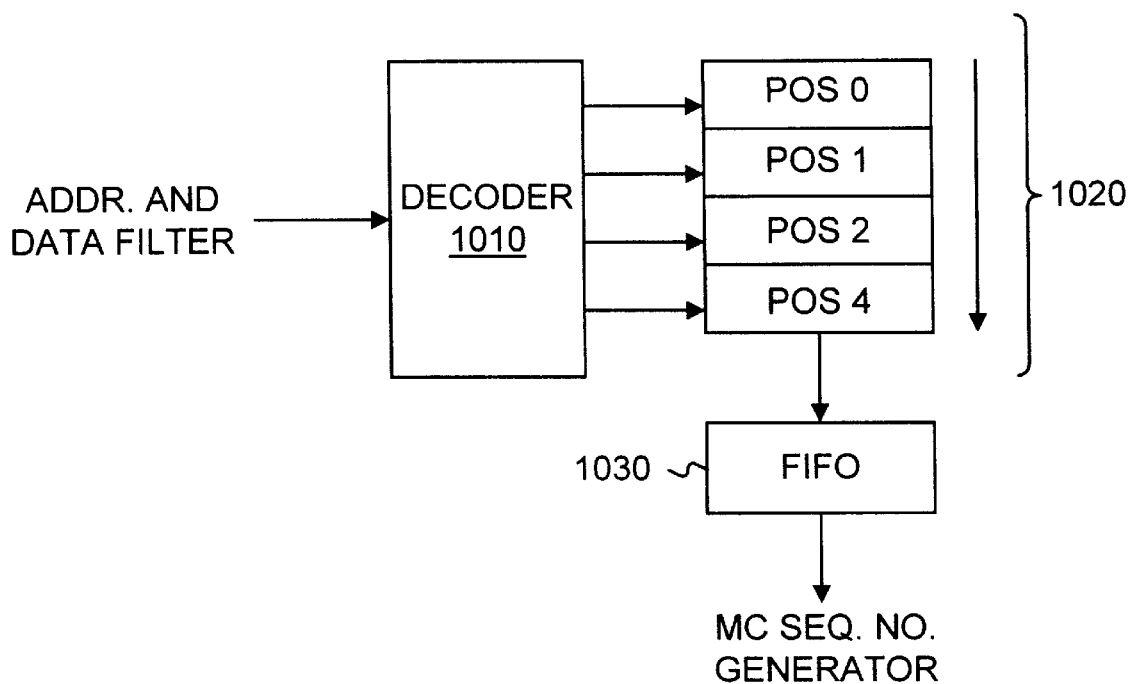
FIG. 10 is a block diagram of the delay equalizer of FIG. 9.

The delay equalizer 930 determines the age of a multicast cell from its hop count 750 to determine its correct sequence among other cells in its data packet. FIG. 10 is a block diagram of the delay equalizer 930, including a decoder 1010, an addressable shift register 1020, and a FIFO register 1030. The decoder 1010 reads the hop count 750 from an arriving cell's routing vector 700 and loads a cell pointer, corresponding to the arriving cell, into the shift register 1020. The decoder 1010 stores the cell pointer at a location dependent upon the value of the cell's hop count 750, such that cells with larger hop count values (i.e., cells that have been in the system longer) are stored in higher priority positions in the shift register 1020 (e.g., POS 4).

The shift register 1020 stores the cell pointers in an order determined by the decoder 1010. As new cells arrive, the shift register 1020 shifts the cell pointers toward the higher priority positions, and eventually out to the FIFO register 1030. The FIFO 1030 is a standard FIFO register that receives the cell pointers from the shift register 1020 and outputs them to the multicast sequence number generator 940 (FIG. 9) in the order in which they were received.

The multicast sequence number generator 940 generates sequence numbers for the multicast cells based on their routing vectors and their order within the FIFO 1030. The output buffer controller 950 manages the operation of the output buffer 810, including the transmission of cells to the output port 620.

POINT-TO-POINT CELL PROCESSING

The system 600 operates under clock cycles divided into two time slots: a first half referred to as time slot TSA, and a second half referred to as time slot TSB. The system 600 performs input and output functions during time slot TSA and processes cells misrouted into non-destination buffers during time slot TSB.

Time Slot TSA Processing

Figure 11A:
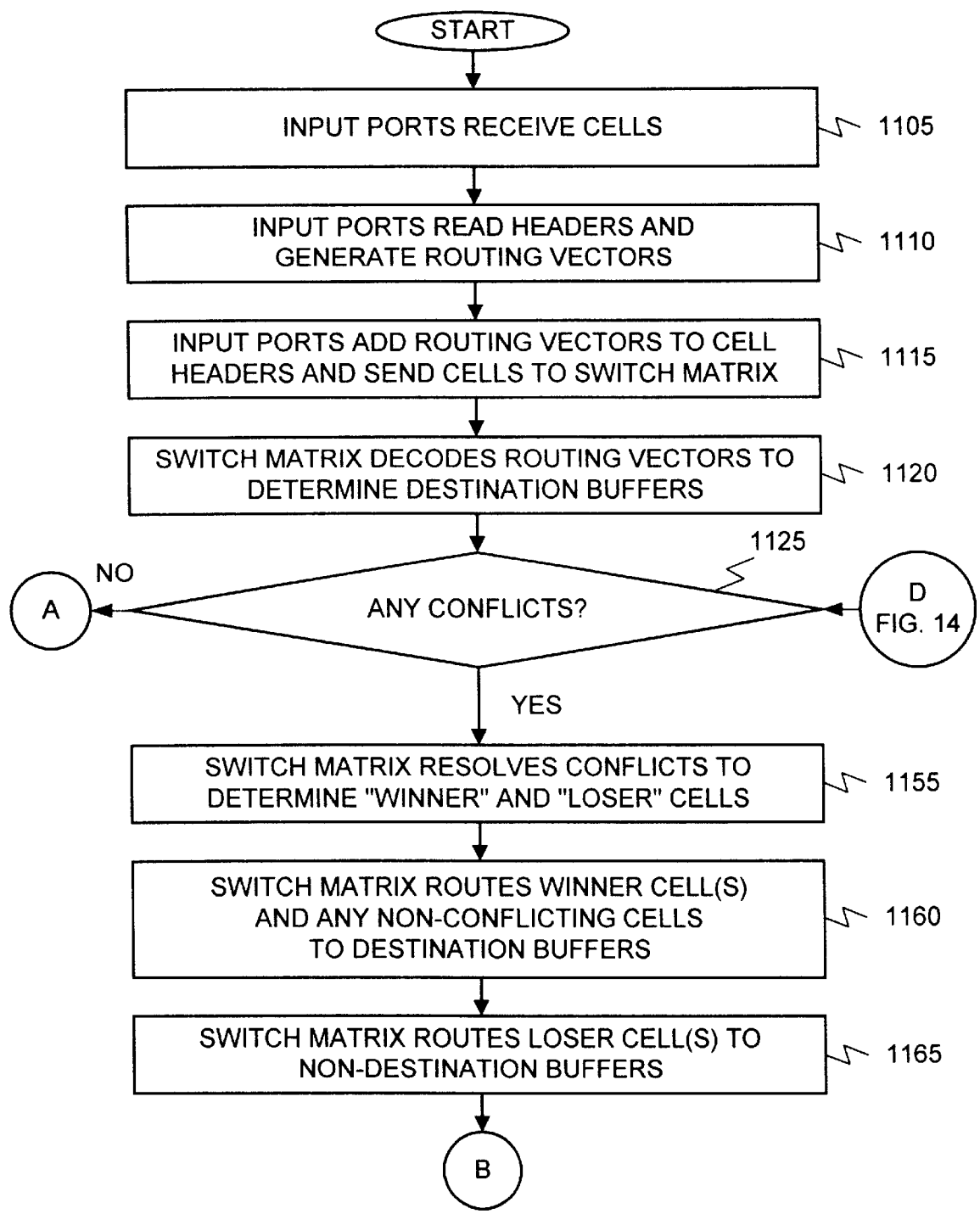
FIGS. 11A–11C are flowcharts of point-to-point cell input processing, consistent with the present invention, during time slot TSA.
Figure 11B:
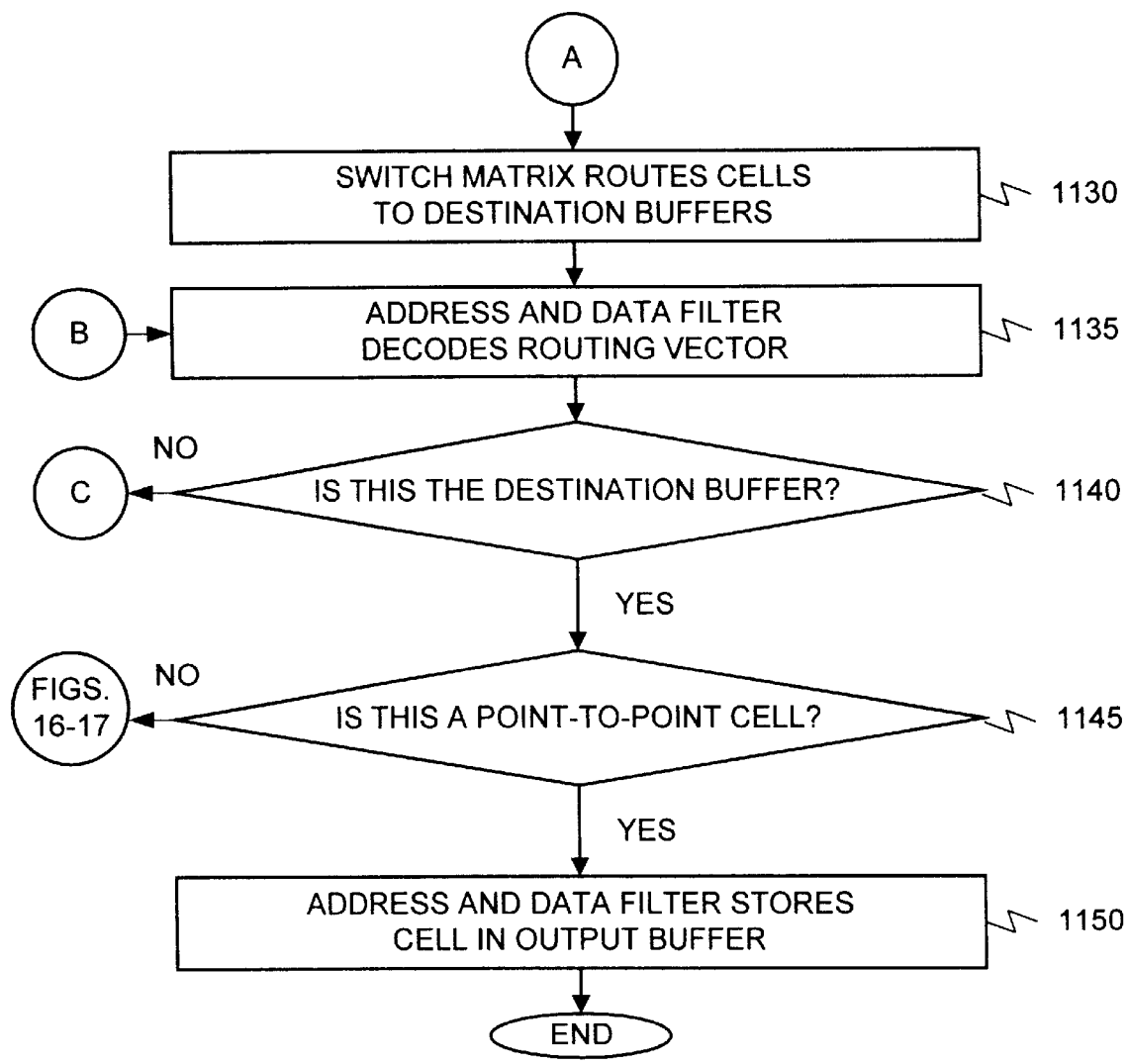
Figure 11C:
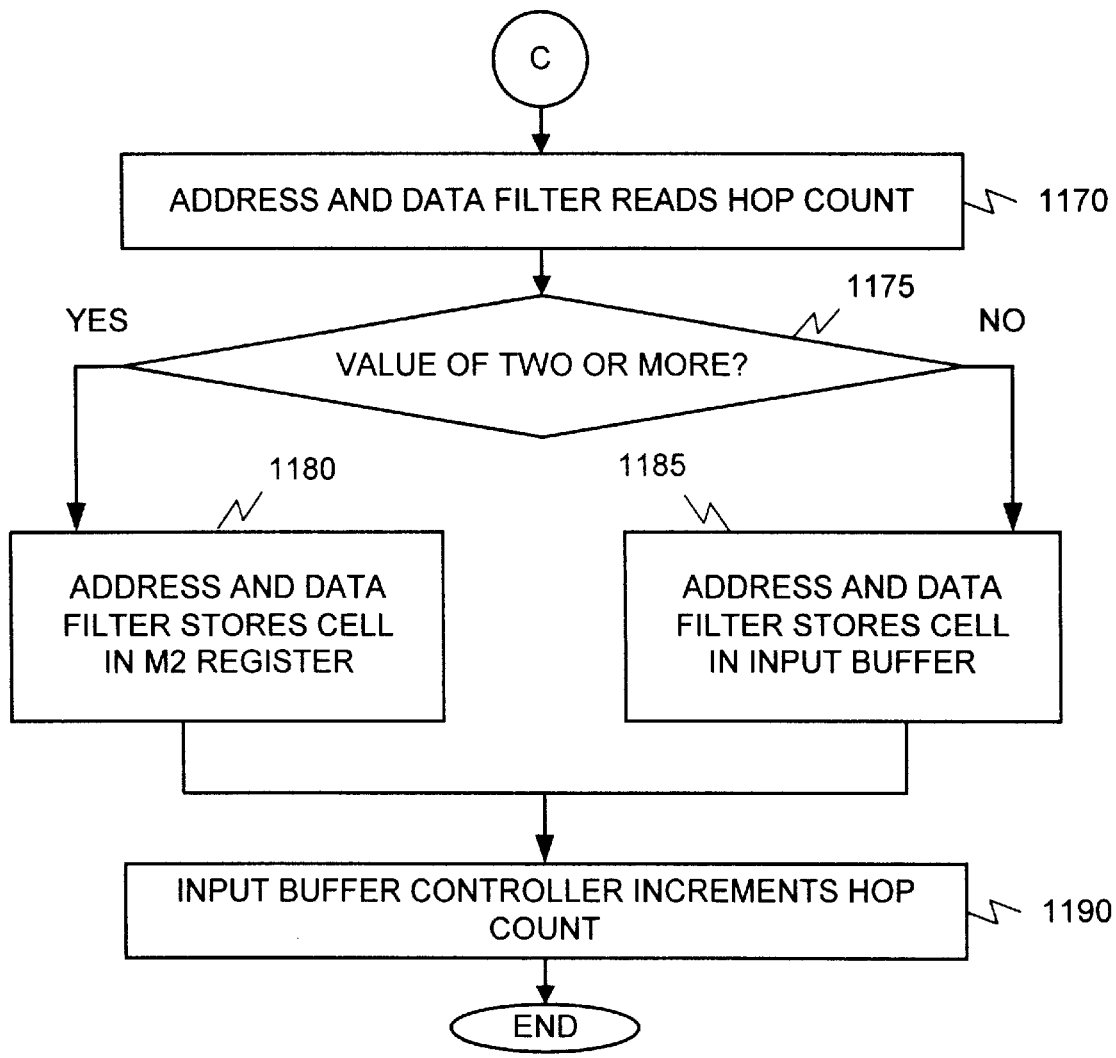

FIGS. 11A–11C and 13 are flowcharts of point-to-point cell processing, consistent with the present invention, during time slot TSA. During time slot TSA, the system 600 performs both input and output processing. FIGS. 11A–11C are flowcharts of input processing performed by the system 600 in a manner consistent with the present invention.

During time slot TSA, one or more of the input ports 610 receive a cell of a data packet from a source over a data channel [step 1105] (FIG. 11A). The input ports 610 decode the cells' headers, identify the cells as point-to-point, multicast, or broadcast cells, and generate routing vectors 700 for the cells [step 1110]. As described with regard to FIG. 7, the routing vectors 700 include information regarding the input port number 710, the cell sequence number 720, the output port number 730, the misrouted cell sequence number 740, and the hop count 750. Because the cells are "new" cells to the system 600, the input ports 610 assign to them a misrouted cell sequence number 740 and hop count 750 of zero.

The input ports 610 then add the routing vectors to the cells' headers and send the cells to the switch matrix 640 [step 1115]. The switch matrix 640 reads the cell routing vectors 700 to identify the destination output buffers 810 corresponding to the output ports 620 identified by the output port numbers 730 [step 1120]. The switch matrix 640 then determines whether any conflict exists [step 1125]. A conflict results when two or more cells contend for the same destination buffer 810.

If no cells contend for the same destination buffer 810, the switch matrix 640 routes the cells to the destination buffers 810 identified by the output port numbers 730 in the cells' routing vectors 700 [step 1130] (FIG. 11B). When a cell arrives at a merged buffer 630, the address and data filter 910 decodes the cell's routing vector 700 to determine whether the merged buffer 630 is the destination buffer for the cell [steps 1135 and 1140]. When the output port number 730 in the cell's routing vector 700 matches the output port 620 corresponding to the merged buffer 630, the merged buffer is the destination buffer.

The address and data filter 910 then determines whether the cell is a point-to-point or multicast/broadcast cell [step 1145]. Multicast and broadcast cell processing are described below with regard to FIGS. 16 and 17. Broadcast cell processing is the same as multicast cell processing, so the two will be described together.

In the case of a point-to-point cell, the address and data filter 910 stores the cell in the output buffer 810 to await transmission via the output port 620 [step 1150]. If two or more of the cells contend for the same destination buffer 810 [step 1125] (FIG. 11A), however, the switch matrix 640 resolves the conflict using any conventional arbitration algorithm, or random selection, to identify "winner" and "loser" cells [step 1155]. The switch matrix 640 then routes the winner cell(s) and any non-conflicting cells to the destination buffers 810 corresponding to the output port 620 identified by the output port number 730 in the cells' routing vectors 700 [step 1160], and the loser cell(s) to non-destination input buffers 820 [step 1165]. A non-destination input buffer corresponds to an input buffer 820 of an output port 620 other than the output port 620 identified by the output port number 730 in the cell's routing vector 700. The switch matrix 640 routes the cells to the non-destination buffers 820 in a manner to balance the load across the system 600.

When a cell arrives at a merged buffer 630, the address and data filter 910 decodes the cell's routing vector 700 to determine whether the merged buffer 630 is the destination buffer for the cell [steps 1135 and 1140] (FIG. 11B). When the merged buffer 630 is the destination buffer, the address and data filter 910 determines whether the cell is a point-to-point or multicast/broadcast cell [step 1145]. Again, multicast/broadcast cell processing is described below with regard to FIGS. 16 and 17. In the case of a point-to-point cell, the address and data filter 910 stores the cell in the output buffer 810 to await transmission via the output port 620 [step 1150].

When the output port number 730 in the cell's routing vector 700 fails to match the output port 620 corresponding to the merged buffer 630 [step 1140], the merged buffer is a non-destination buffer. In this case, the address and data filter 910 reads hop count 750 from the cell's routing vector 700 [step 1170] (FIG. 11C). If hop count 750 contains a value of two or more [step 1175], meaning that the cell has been routed to a non-destination buffer two or more times, the address and data filter 910 stores the cell in the M2 register 830 [step 1180]. Otherwise, the address and data filter 910 stores the cell in the input buffer 820 [step 1185]. In either case, the input buffer controller 920 increments the hop count 750 in the cell's routing vector 700 [step 1190].

Figure 12:
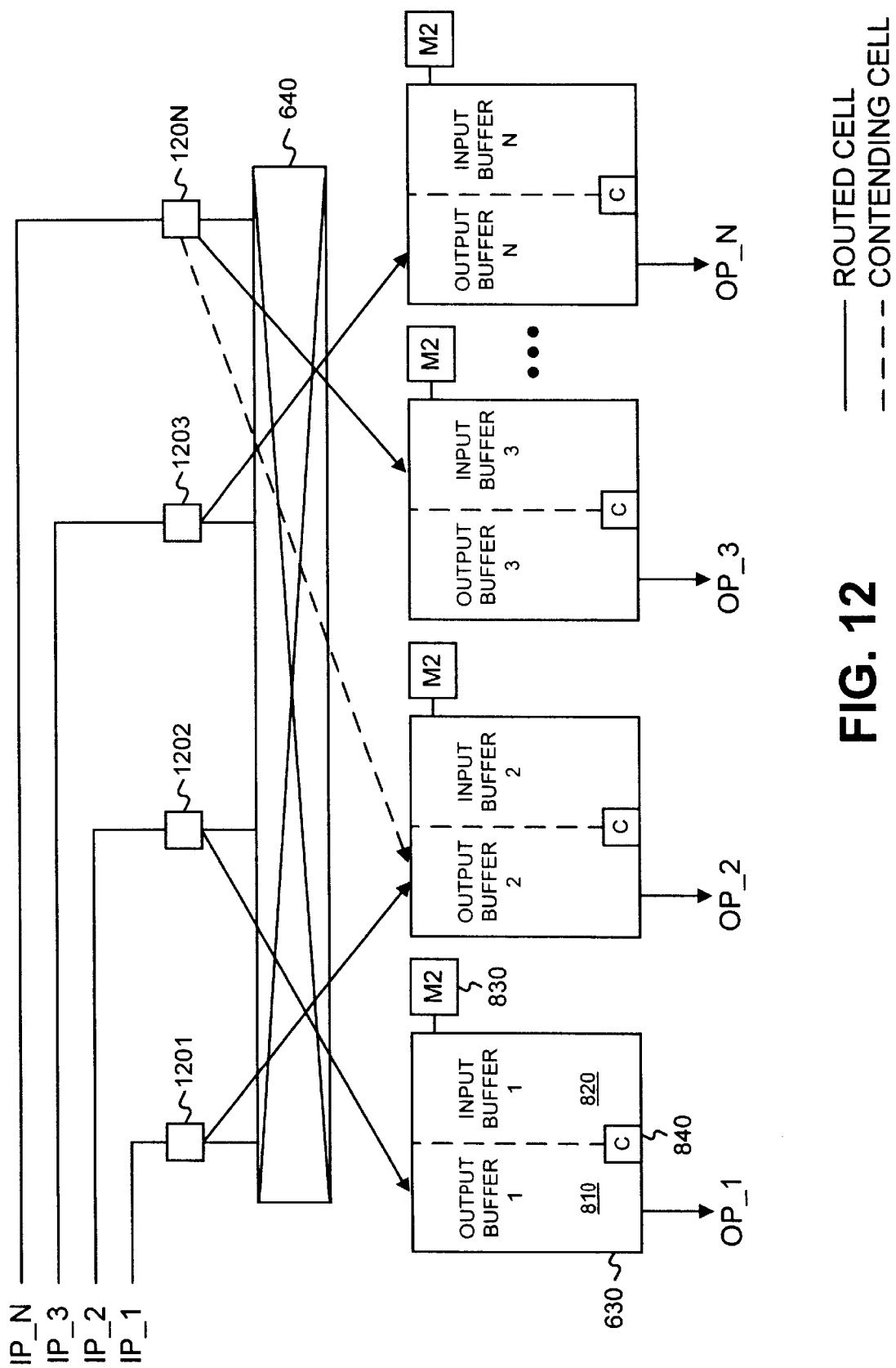
FIG. 12 is an exemplary diagram of the point-to-point cell input processing during time slot TSA.

FIG. 12 is an exemplary diagram of the point-to-point cell input processing during time slot TSA. Assume that N input cells 1201, ..., 120N arrive at input ports IP_1, ..., IP_N, respectively. The input ports decode the cells' headers and generate routing vectors. Assume that cell 1201 arrives at input port 1, is the second cell in a data packet, and is destined for output port OP_2. A routing vector consistent with the format of FIG. 7 could have the value 17200. Similarly, assume that cell 1202 has a routing vector equal to 23100, that cell 1203 has a routing vector equal to 31N00, and that cell 120N has a routing vector equal to N3200.

The input ports transmit the cells to the switch matrix 640. The switch matrix 640 reads the routing vectors of the cells and determines that cells 1201 and 120N contend for the same output port (i.e., OP_2), and that cells 1202 and 1203 are non-contending cells. The switch matrix 640 routes non-contending cells 1202 and 1203 to their respective destination buffers 1 and N. Using an arbitration algorithm, the switch matrix 640 selects a winner and loser among contending cells 1201 and 120N. Assuming that the switch matrix 640 selects cell 1201 as the winner, the switch matrix 640 routes cell 1201 to its destination buffer 2 and routes cell 120N to non-destination buffer 3. Assuming that the cell 120N is the first cell misrouted to buffer 3, controller 670 associated with buffer 3 updates the routing vector to N3210. Therefore at the end of the time slot TSA, output buffer 1 stores cell 1202, output buffer 2 stores cell 1201, input buffer 3 stores cell 120N, and output buffer N stores cell 1203.

Figure 13:
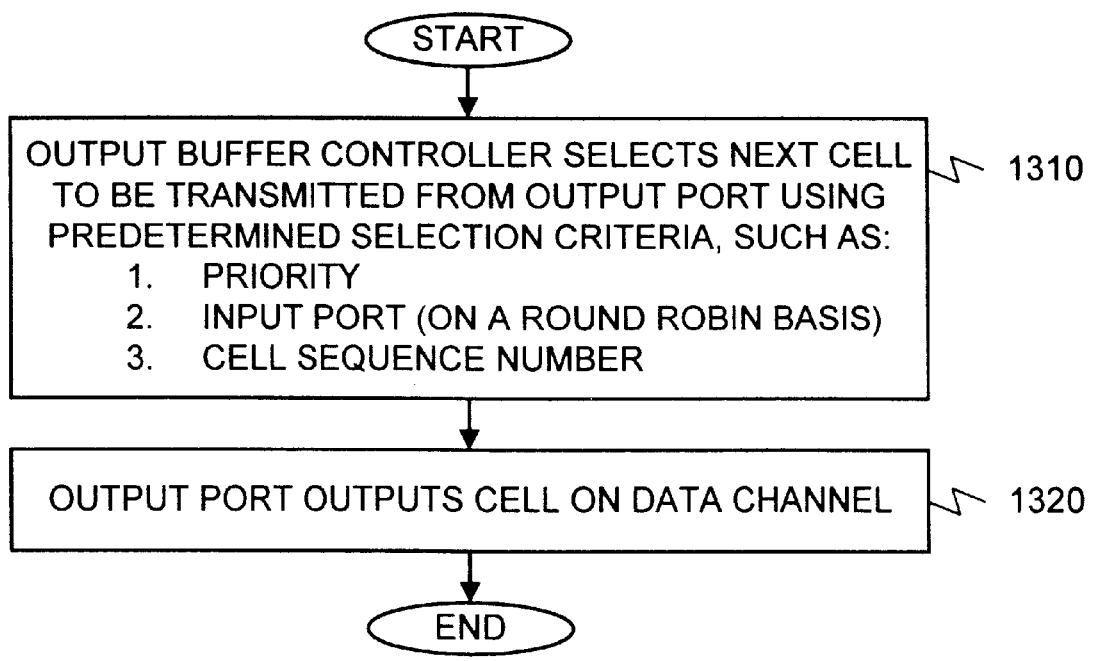
FIG. 13 is a flowchart of point-to-point cell output processing, consistent with the present invention, during time slot TSA.

FIG. 13 is a flowchart of output processing performed by the system 600 in a manner consistent with the present invention. The system 600 performs the output processing concurrently with the input processing described above with regard to FIGS. 11A–11C.

During time slot TSA, each of the output buffer controllers 950 selects the next cell to be transmitted from the corresponding output port 620, using predetermined selection criteria, such as by first using priority (if any), then using input port number 710 on a round-robin basis, and finally using cell sequence number 720 [step 1310]. For example, assume that the output buffer 810 contains three cells having the following routing vectors with no priority: (cell 1) 21310; (cell 2) 12300; and (cell 3) 17320. The cells would be output to the output port 620 in the following order: cell 2, cell 1, and cell 3. The round-robin selection by input port number 710 results in selection of cell 1 before cell 3. The output port 620 outputs the cell on a data channel in the order determined by the output buffer controller 950 [step 1320].

Time Slot TSB Processing

Figure 14:
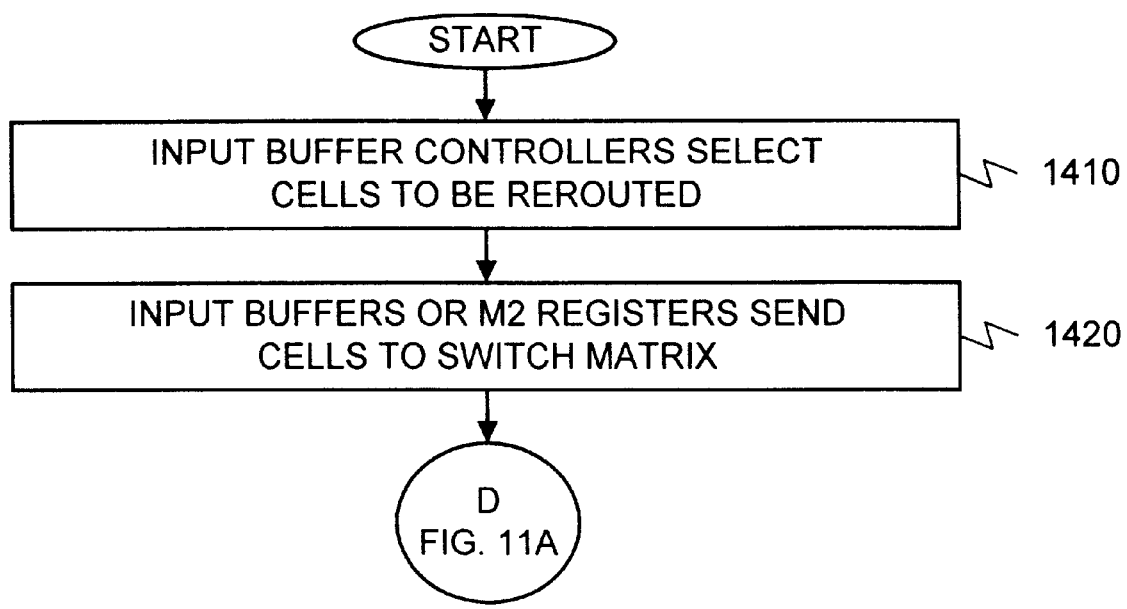
FIG. 14 is a flowchart of point-to-point cell processing, consistent with the present invention, during time slot TSB.

FIG. 14 is a flowchart of point-to-point cell processing during time slot TSB in a manner consistent with the present invention. During time slot TSB, the system 600 processes cells that were routed to non-destination buffers. Initially, each of the input buffer controllers 920 selects a cell to be rerouted [step 1410]. To make the selection, the controller 920 first determines whether the M2 register 830 stores a cell. If it does, the controller 920 selects that cell. Otherwise, the controller 920 selects a cell from the input buffer 820, using, for example, its misrouted cell sequence number 740 to make the selection. To expedite cell throughput, the controller 920 may select a cell having the smallest misrouted cell sequence number 740 to be selected. The M2 register 830 or the input buffer 820, whichever stores the selected cell, sends the cell to the switch matrix 640 via the feedback path 650 [step 1420].

Processing then proceeds to step 1125 in FIG. 11A, where the switch matrix 640 determines whether any conflicts exist. The processing then follows the steps described above with regard to FIGS. 11A–11C. Processing in time slot TSB concludes with an additional step not shown in FIGS. 11A–11C. At the conclusion of time slot TSB, the input and output buffer controllers 920 and 950, respectively, increment the hop counts 750 for each of the cells stored in the input and output buffers 820 and 810, respectively. In this way, the hop counts 750 reflect the length of time in clock cycles (i.e., time slot TSA plus time slot TSB) that the cells have been in the system 600.

Figure 15:
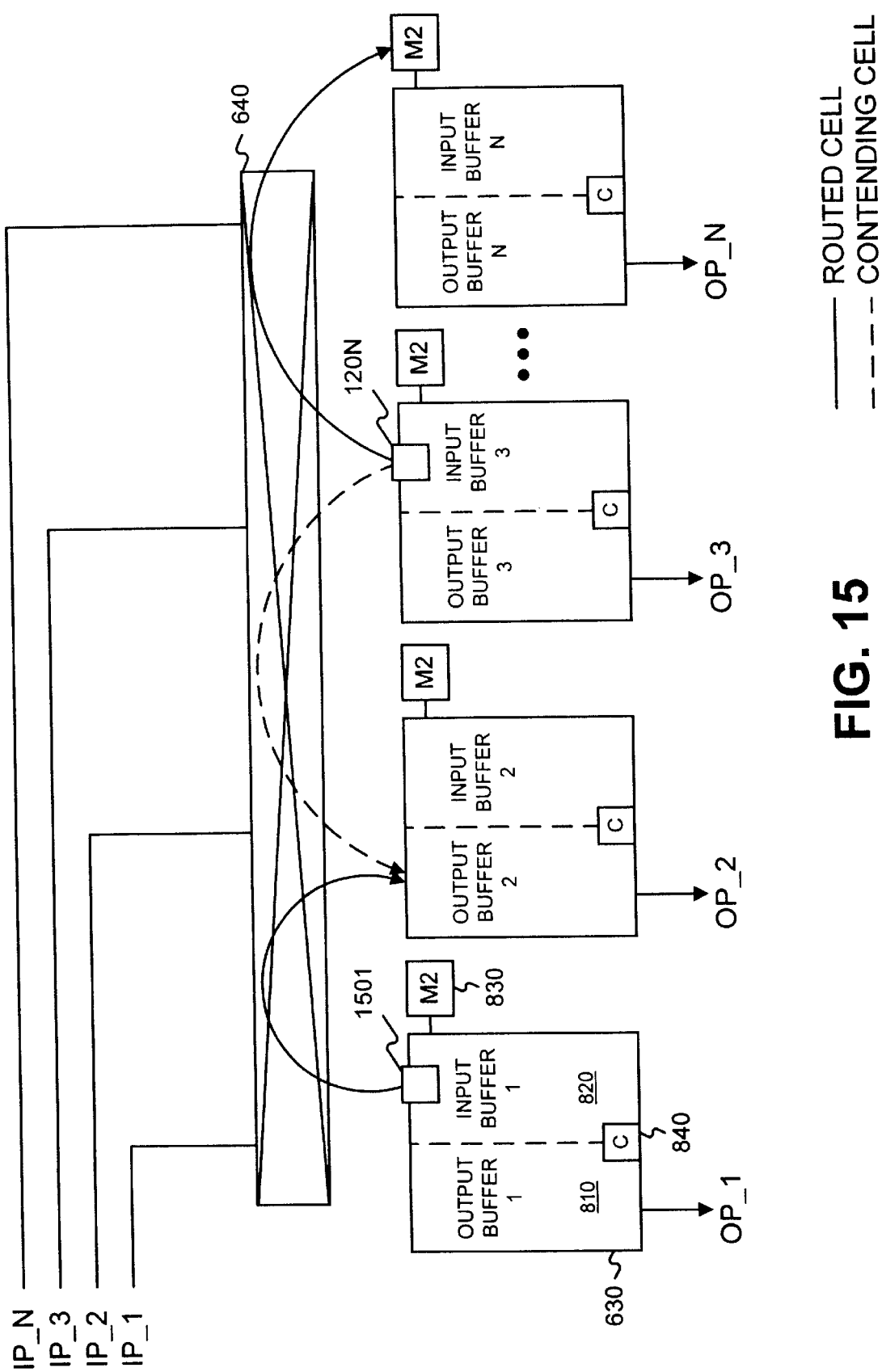
FIG. 15 is an exemplary diagram of the point-to-point cell processing during time slot TSB.

FIG. 15 is an exemplary diagram of the point-to-point cell processing during time slot TSB. This example begins where the example of FIG. 12 concluded. At the end of time slot TSA, output buffer 1 stored cell 1202, output buffer 2 stored cell 1201, input buffer 3 stored cell 120N, and output buffer N stored cell 1203. Therefore, the only misrouted cell was cell 120N. Assume that input buffer 1 also stores a previously misrouted cell 1501. Assume further that the output port number 730 for cell 1501 identifies output buffer 2—the same as cell 120N.

When time slot TSB begins, cells 1501 and 120N contend again for output buffer 2 within the switch matrix 640. The switch matrix 640 uses its arbitration algorithm to select a winner and loser among contending cells 1501 and 120N. Assuming that the switch matrix 640 selects cell 1501 as the winner, the switch matrix 640 routes cell 1501 to its destination buffer 2 and routes cell 120N to the non-destination buffer N. The misrouted cell sequence number 740 is maintained at 1. The non-destination buffer N stores cell 120N in its M2 register because the cell has been misrouted more than once. Therefore, at the end of the time slot TSB, output buffer 2 stores cell 1201 and the M2 register of buffer 3 stores cell 120N.

MULTICAST AND BROADCAST CELL PROCESSING

Processing for multicast and broadcast cells is the same, but differs from the processing described above with regard to point-to-point cells. The following description relates to processing for a single multicast cell received at an input port 610 of the system 600. From this description, one skilled in the art would understand how the system 600 concurrently operates on several cells, including point-to-point, multicast, and broadcast cells.

Time Slot TSA Processing

Figure 16:
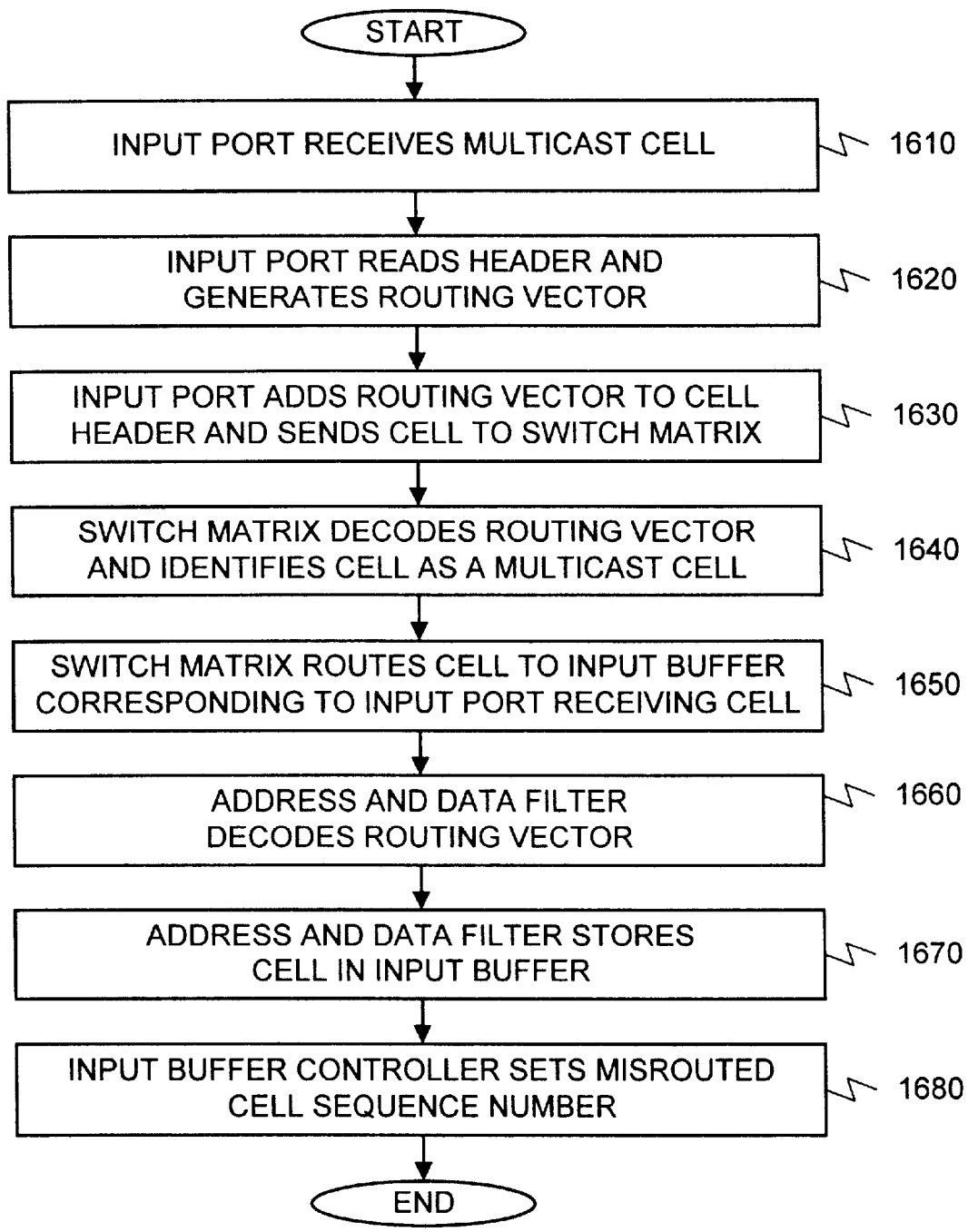
FIG. 16 is a flowchart of multicast cell input processing during time slot TSA in a manner consistent with the present invention.

FIG. 16 is a flowchart of multicast cell input processing during time slot TSA in a manner consistent with the present invention. The multicast cell output processing is similar to the point-to-point cell output processing described above with regard to FIG. 13 and, therefore, will not be repeated.

During time slot TSA, an input port 610 receives a multicast cell of a data packet from a source over a data channel [step 1610]. The input port 610 decodes the cell's header, identifies the cell as a multicast cell, and generates a routing vector 700 for the cell [step 1620]. For a multicast cell, the input port 610 may store a predetermined number, such as zero, in the cell sequence number 720, leaving the sequence number generation for the destination buffer 630. The output port number 730 in the routing vector 700 identifies several destination buffers 630 for the multicast cell. Because the cell is "new" to the system 600, the input port 610 assigns it a misrouted cell sequence number 740 and hop count 750 of zero.

The input port 610 then adds the routing vector to the cell's header and sends the cell to the switch matrix 640 [step 1630]. The switch matrix 640 reads the cell's routing vector 700 and determines that the cell is a multicast cell [step 1640]. The switch matrix 640 might make this determination when the cell sequence number 720 stores the predetermined number or when the output port number 730 identifies more than a single output port 620. In any event, the switch matrix 640 routes the cell to the input buffer 820 of the merged buffer 630 corresponding to the input port 610 identified by the input port number 710 in the cell's routing vector 700, regardless of the output ports 620 identified by the output port number 730 [step 1650]. For example if the cell arrived at the input port IP_1, the switch matrix 640 routes the cell to the merged buffer 630 corresponding to output port OP_1, regardless of whether the output port OP_1 is a destination output port.

Of course in the case of multiple cells received at the input ports 610 during time slot TSA, the switch matrix 640 resolves any conflicts that arise due to multiple cells contending for the same merged buffer 630. Assume for this example, that no conflicts exist.

When the cell arrives at the merged buffer 630, the address and data filter 910 decodes the cell's routing vector 700 to determine whether the merged buffer 630 is the destination buffer for the cell [step 1660]. In this case, the address and data filter 910 identifies the cell as a multicast cell and stores it in the input buffer 820, regardless of whether this is a destination buffer [step 1670]. In order to expedite processing of the multicast cell, the input buffer controller 920 sets the misrouted cell sequence number 740 in the cell's routing vector 700 [step 1680].

Time Slot TSB Processing

Figure 17:
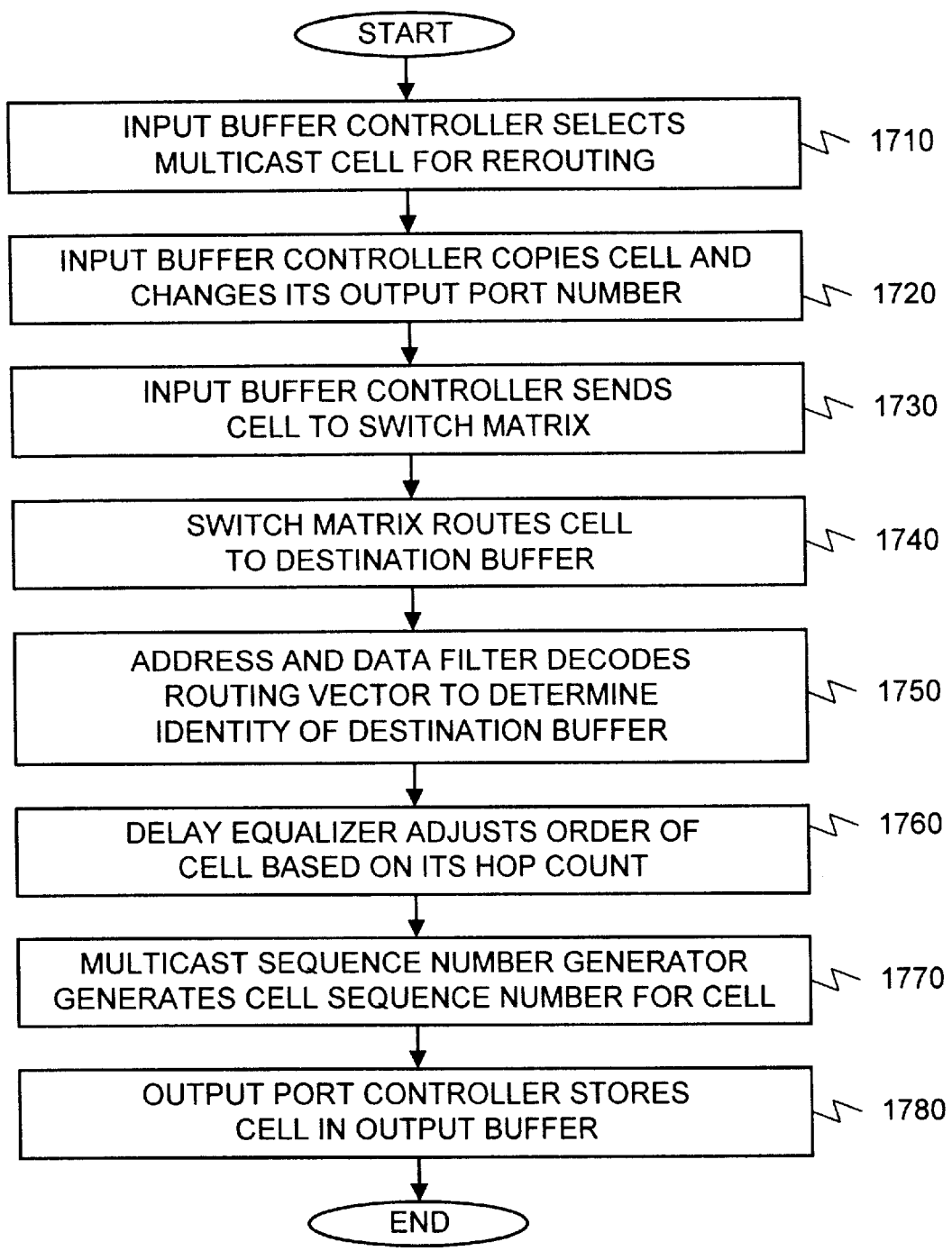
FIG. 17 is a flowchart of multicast cell processing during time slot TSB in a manner consistent with the present invention.

FIG. 17 is a flowchart of multicast cell processing during time slot TSB in a manner consistent with the present invention. At the beginning of time slot TSB, the input buffer controller 920 selects the multicast cell for rerouting [step 1710]. The input buffer controller 920 copies the cell and changes the output port number 730 in the copied cell's routing vector 700 to identify one of the output ports 620 [step 1720]. The input buffer controller 920 leaves the original cell in the input buffer 820, but changes its output port number 730 to remove identification of the output port 620 of the copied cell.

The input buffer controller 920 sends the copied cell to the switch matrix 640 [step 1730] for routing to its destination buffer 630. Assuming no other cells contend for the same destination buffer 630, the switch matrix 640 routes the cell to its destination buffer [step 1740]. If cell contention exits, the switch matrix 640 handles it in a manner similar to the point-to-point processing described above with regard to FIGS. 11A–11C.

When the cell arrives at the destination buffer 630, the address and data filter 910 decodes the cell's routing vector 700 and, in this case, determines that this is a multicast cell intended for this destination buffer 630 based on its cell sequence number 720 and/or output port number 730 [step 1750]. As a result, the address and data filter 910 sends the cell to the delay equalizer 930. The delay equalizer 930 places a cell pointer in one of the positions of the shift register 1020 based on its hop count 750 [step 1760]. In this way, the delay equalizer 930 adjusts the order of the cell by placing cells with higher hop counts 750 in higher priority positions in the register 1020. At the end of time slot TSB, the equalizer 930 shifts the cells in the register 1020 to maintain the proper sequence for the cells.

The FIFO register 1030 within the equalizer 930 outputs the multicast cells in the proper sequence to the multicast sequence number generator 940. When the sequence number generator 940 receives the cell from the equalizer 930, it generates a cell sequence number 720 for the cell [step 1770]. The sequence number 720 resembles the sequence number for the point-to-point cells. As a result, the system 600 considers the multicast cell just another point-to-point cell. The output buffer controller 950 stores the cell in the output buffer 810 to await transmission via the output port 620 [step 1780].

At the conclusion of time slot TSB, the input and output buffer controllers 920 and 950, respectively, increment the hop counts 750 for each of the cells stored in the input and output buffers 820 and 810, respectively. In this way, the hop counts 750 reflect the length of time in clock cycles (i.e., time slot TSA plus time slot TSB) that the cells have been in the system 600.

MODULAR BIT RATES

A distributed MBA system consistent with the present invention may be configured in a modular fashion to accommodate output ports of modular bit rates. This is very useful in ATM switches, since it is quite expensive and wasteful to use high-speed output ports for low-speed traffic. In a manner consistent with the present invention, the distributed MBA system can be configured to have several low speed buffers to handle low speed traffic and to group several of the buffers to handle high speed traffic.

The system can be reprogrammed and reconfigured to process different types of traffic patterns. In this manner, a single ATM switch card can adapt to traffic in the field such that each buffer operates under maximum or nearly maximum load, thereby minimizing wasted throughput capabilities. None of the prior art techniques offers the advantage of modular output port bandwidth. In the prior art, if the switch is designated for throughput at a certain rate, external hardware in the way of secondary buffers and multiplexers, both costly in design and real estate, are used to divide the throughput.

Figure 18:
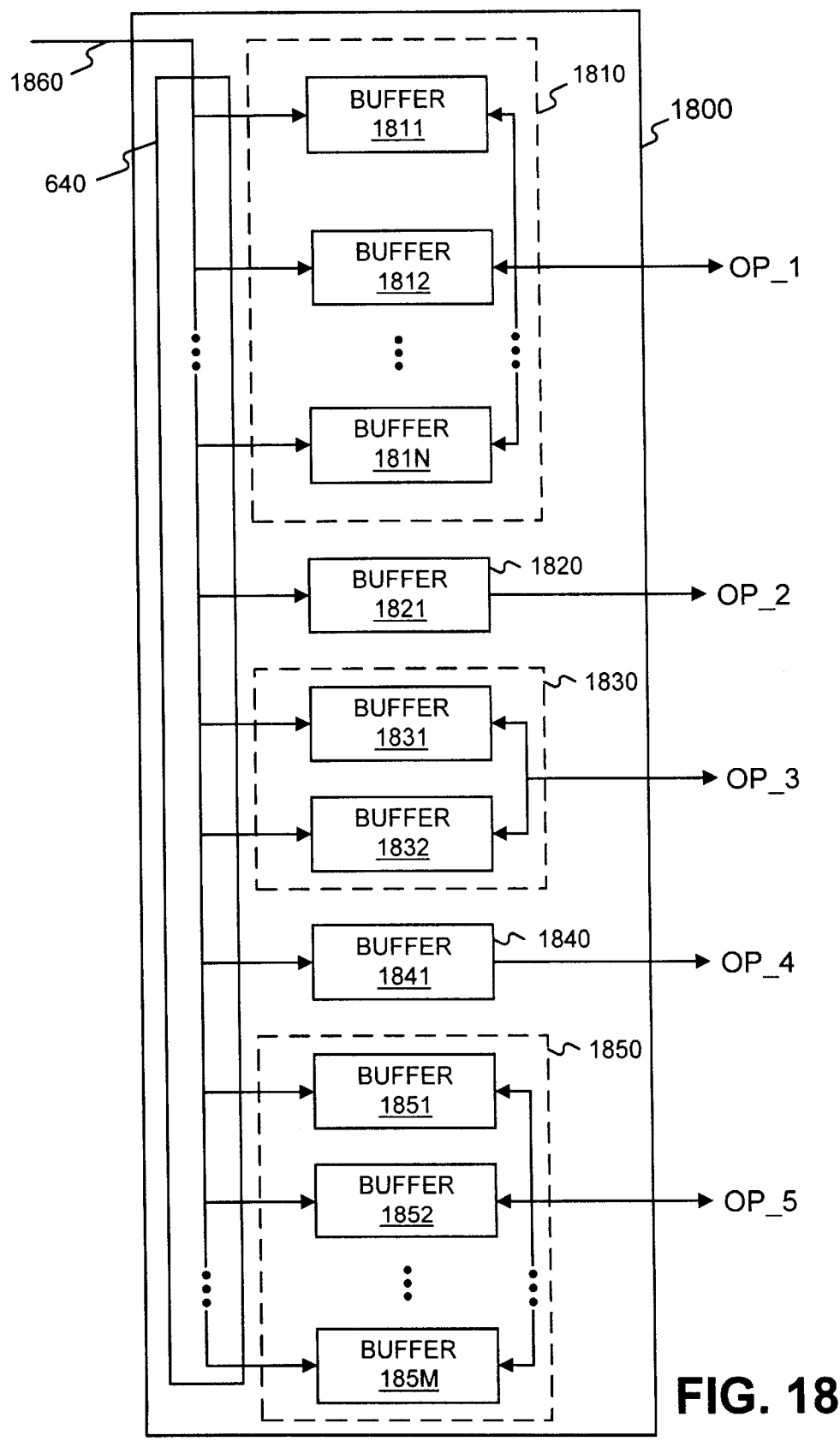
FIG. 18 is a diagram of an exemplary system with modular bit output ports consistent with the present invention.

FIG. 18 is a diagram of an exemplary system 1800 with modular bit output ports consistent with the present invention. The exemplary system 1800 includes five groups of merged buffers 1810–1850. Buffer group 1810 includes N buffers 1811–181N; buffer group 1820 includes a single buffer 1821; buffer group 1830 includes two buffers 1831 and 1832;

buffer group 1840 includes a single buffer 1841; and buffer group 1850 includes M buffers 1851–185M.

In this example, an input trunk 1860 includes 256 input lines transmitting data at 50 Mb/s throughput rates. The input trunk 1860 connects to the merged buffer groups 1810–1850 via the switch matrix 640. The system achieves higher throughput rates on the output ports (i.e., OP_1, OP_3, and OP_5) by grouping buffers together. For example, assume that each buffer of a buffer group 1810–1850 has a 50 Mb/s throughput rate. Therefore, because buffers 1831 and 1832 have been grouped together as buffer group 1830, their throughput rates combine for a 100 Mb/s throughput on output port OP_3. Likewise, output ports OP_2 and OP_4 each operate at 50 Mb/s, while output port OP_1 operates at N×50 Mb/s and output port OP_5 operates at M×50 Mb/s.

In this manner, the efficiency of each output port can be maximized in factors of 50 Mb/s, thereby wasting little or none of their throughput capabilities. To maximize efficiency, the system 1800 operates at the rate of the least common port speed, rather than requiring the buffers to operate at higher speeds as in the prior art.

CONCLUSION

The distributed MBA architecture consistent with the present invention offers at least two advantages over the central CAM controller. First, the distributed control elements have a fixed speed-up factor of two that does not increase as the width N of the input/output bus increases. The speed-up factor of two is necessary for service of the two time slots TSA and TSB.

Second, the distributed MBA architecture eliminates the requirement for a global control bus, thereby also eliminating interconnect and costly controlled-impedance connections. This significant performance benefit is achieved at the minor architectural expense of including a controller for each of the merged buffers. When implemented as an integrated circuit, the distributed MBA control hardware accounts for a relatively small fraction of the complete system's total transistor count. As a result, increasing the amount of control hardware with distributed controllers to achieve higher system performance results in a beneficial tradeoff.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, the multicast sequence number generator has been described as generating the sequence numbers for only multicast and broadcast cells. The sequence generator may also generate the sequence numbers for point-to-point cells. In addition, the system may use the hop count values for point-to-point cells, as well as multicast and broadcast cells.

What is claimed is:

1. A switch comprising:
a plurality of input ports that receive cells of a data packet from a source;
a plurality of output ports that output the cells in an order in which the input ports receive the cells; and
a plurality of merged buffers, corresponding to the plurality of output ports, that temporarily store the cells received by the input ports, each of the merged buffers including
an output buffer that stores cells for transmission by a corresponding one of the output ports,
an input buffer that temporarily stores cells for rerouting to at least another one of the output ports, and
a controller that reroutes the cells stored in the input buffer to output buffers corresponding to other ones of the output ports.

2. The switch of claim 1, wherein each of the input ports includes:
a routing vector generator that generates a routing vector for each of the cells to guide the cells through the switch.

3. The switch of claim 2, wherein the routing vector includes:
an input port number that identifies the input port that received the cell,
a sequence number that identifies a position of the cell within the data packet, and
an output port number that identifies the output port from which the cell is to be transmitted.

4. The switch of claim 3, wherein the routing vector further includes:
a misrouted cell sequence number that identifies the sequence of a cell routed to one of the input buffers.

5. The switch of claim 4, wherein the routing vector further includes:
a hop count that identifies a number of periods that the cell remains in the switch after being received by one of the input ports.

6. The switch of claim 1, further comprising:
a switch matrix, connected to the input ports and the merged buffers, that routes the cells to the merged buffers.

7. The switch of claim 6, wherein the switch matrix includes:
an arbitrator that resolves conflicts when two or more cells contend for a same one of the merged buffers.

8. The switch of claim 1, wherein the switch operates under a clock cycle having first and second time slots, the input ports receiving the cells and the output ports transmitting the cells during the first time slot, the controllers rerouting cells stored in the input buffers during the second time slot.

9. The switch of claim 8, wherein each of the merged buffers further includes:

a register that temporarily stores cells that have been rerouted at least twice.

10. The switch of claim 9, wherein each of the controllers includes:

a selection unit that selects a cell from the register for rerouting during the second time slot when the register stores a cell.

11. The switch of claim 1, wherein for at least one of the output ports there is a corresponding group of merged buffers to increase an output rate of the at least one output port.

12. The switch of claim 1, wherein at least some of the output ports have different output rates.

13. A method for routing cells through a switch having a plurality of input ports, a plurality of output ports, and a plurality of merged buffers, each of the merged buffers including an output buffer, an input buffer, and a controller, the method comprising:

receiving cells of a data packet from a source at the input ports;

routing each of the cells to one of the output buffers or one of the input buffers;

storing cells in the output buffers for transmission by a corresponding one of the output ports;

temporarily storing, the cells in the input buffers for rerouting to at least another one of the output ports;

rerouting, by the controllers, the cells from the input buffers to the output buffers; and transmitting the cells stored in the output buffers from the output ports.

14. The method of claim 13, wherein the receiving the cells includes:

reading a header for each of the cells, and generating a routing vector based on the header to guide the cells through the switch.

15. The method of claim 13, wherein the switch operates under a clock cycle having first and second time slots, the input ports receiving the cells and the output ports transmitting the cells during the first time slot, the controllers rerouting the cells from the input buffers during the second time slot.

16. The method of claim 15, wherein each of the merged buffers further includes a register; and wherein the method further comprises:

temporarily storing, cells that have been rerouted at least twice in the registers.

17. The method of claim 16, further comprising:

selecting a cell from the register for rerouting during the second time slot when the register stores a cell.

18. A system for routing cells through a switch, comprising:

means for receiving cells of a plurality of data packets;

means for outputting the cells in an order in which the receiving means received the cells;

means for storing cells for transmission by a corresponding one of the outputting means;

means for temporarily storing cells for rerouting to at least another one of the outputting means; and means for rerouting the temporarily stored cells to the storing means.

19. In a system that routes cells received at a plurality of input ports to a plurality of output ports, a plurality of merged buffers that temporarily store the cells for the output ports, each of the merged buffers comprising:

an output buffer that stores cells for transmission by a corresponding one of the output ports;

an input buffer that temporarily stores cells for rerouting to at least another one of the output ports; and a controller that reroutes the cells stored in the input buffer to output buffers corresponding to other ones of the output ports.

20. The merged buffer of claim 19, wherein the switch operates under a clock cycle having first and second time slots, the input ports receiving the cells and the output ports transmitting the cells during the first time slot, the controllers rerouting the cells stored in the input buffers during the second time slot.

21. The merged buffer of claim 20, further comprising:

a register that temporarily stores cells that have been rerouted at least twice.

22. The merged buffer of claim 21, wherein each of the controllers includes:

a selection unit that selects a cell from the register for rerouting during the second time slot when the register stores a cell.

23. The merged buffer of claim 19, wherein for at least one of the output ports there is a corresponding group of merged buffers to increase an output rate of the at least one output port.

24. A routing vector data structure for guiding one of a plurality of cells of a data packet through a switch having input and output ports, comprising:

an input port number that identifies an input port that received the cell;

a sequence number that identifies a position of the cell within the data packet;

an output port number that identifies an output port from which the cell is to be transmitted; and a misrouted cell sequence number that identifies the sequence of the cell routed to a buffer of an output port other than the output port identified by the output port number.

25. The routing vector data structure of claim 24, further comprising:

a hop count that identifies a number of periods that the cell remains in the switch after being received by the input ports.

26. A method for routing a plurality of cells through a switch that operates under a clock cycle having first and second time slots, the switch including a plurality of input ports, a plurality of output ports, and a plurality of merged buffers, each of the merged buffers including an input buffer, an output buffer, and a controller, the method comprising:

during the first time slot, receiving cells of a plurality of data packets at the input ports, routing each of the cells to one of the output buffers or one of the input buffers, storing the cells in the output buffers for transmission by a corresponding one to of the output ports, temporarily storing the cells in the input buffers for rerouting to at least another one of the output ports, and outputting the cells stored in the output buffers from the output ports; and during the second time slot, selecting, by the controllers, cells stored in the input buffers, rerouting each of the selected cells to one of the output buffers or one of the input buffers, storing the cells in the output buffers for transmission by the corresponding output ports, and temporarily storing the cells in the input buffers for rerouting to at least another one of the output ports.

27. A method for routing a plurality of cells within a switch having input ports, output ports, and merged buffers, each of the merged buffers including an input buffer, an output buffer, and a controller, the method comprising:

receiving the cells at the input ports, each of the cells having a sequence within a data packet;

generating routing vectors for the cells;

routing a first set of the cells to an output buffer based on its routing vector and a second set of cells to an input buffer different from its routing vector;

storing the cells in the first set of cells in respective output buffers;

temporarily storing the cells in the second set of cells in respective input buffers;

selecting cells from the input buffers;

rerouting the selected cells based on their routing vectors;

repeating the routing, storing, temporarily storing, selecting, and rerouting steps until all of the cells are stored in output buffers based on their routing vectors; and outputting the cells stored in the output buffers from the output ports.

28. The method of claim 27, wherein the routing includes:

determining whether a conflict exists among the cells based on their routing vectors, resolving the conflict to identify a set of winner cells and a set of loser cells, transmitting cells of the set of winner cells to an output buffer based on its routing vector, transmitting cells of the set of loser cells to an input buffer different from its routing vector, and transmitting any non-conflicting cells to output buffers based on their routing vectors.

29. The method of claim 28, wherein the storing and temporarily storing respectively include:

storing cells of the set of winner cells and the non-conflicting cells in the output buffers, and temporarily storing cells of the set of loser cells in the input buffer.

30. The method of claim 27, further comprising:

identifying a received cell as a multicast cell;

generating a routing vector for the multicast cell that identifies a group of the output ports;

routing the multicast cell to an input buffer based on the input port receiving the multicast cell; and temporarily storing the multicast cell in the input buffer;

rerouting the multicast cell from the input buffer to output buffers corresponding to the output ports in the group; and transmitting the multicast cell from the output ports in the group.

31. The method of claim 30, wherein the rerouting includes:

copying the multicast cell for rerouting, changing the routing vector of the copied cell to identify one of the output ports in the group, rerouting the copied cell to an output buffer based on its changed routing vector, and storing the copied cell in the output buffer.

32. The method of claim 31, wherein the transmitting the multicast cell includes:

identifying a sequence of the multicast cell within its data packet, and outputting the multicast cell from the output ports based on the identified sequence.

33. A method for routing a plurality of cells within a switch having input ports, output ports, and merged buffers, each of the merged buffers including an input buffer, an output buffer, and a controller, the method comprising:

receiving the cells at the input ports, each of the cells having a sequence within a data packet;

identifying at least one of the received cells as a multicast cell;

generating a routing vector for the multicast cell that identifies a group of the output ports;

routing the multicast cell to an input buffer based on the input port receiving the multicast cell; and temporarily storing the multicast cell in the input buffer;

rerouting the multicast cell from the input buffer to output buffers corresponding to the output ports in the group; and transmitting the multicast cell from the output ports in the group.

34. The method of claim 33, wherein the rerouting includes:

copying the multicast cell for rerouting, changing the routing vector of the copied cell to identify one of the output ports in the group, rerouting the copied cell to an output buffer corresponding to the identified output port based on its changed routing vector, and storing the copied cell in the output buffer.

35. The method of claim 33, wherein the transmitting the multicast cell includes:

identifying a sequence of the multicast cell within its data packet, and outputting the multicast cell from the output ports based on the identified sequence.

36. A switch comprising:

a plurality of input ports that receive cells of a data packet from a source;

a plurality of output ports that output the cells in an order in which the input ports receive the cells; and a plurality of distributed merged buffers, corresponding to the plurality of output ports, that temporarily store the cells received by the input ports for at least one of transmission by a corresponding one of the output ports and rerouting to at least another one of the output ports.

* * * * *